US008067692B2

(12) United States Patent
Hiner et al.

(10) Patent No.: US 8,067,692 B2
(45) Date of Patent: Nov. 29, 2011

(54) CUSION GRIP TWIST-ON WIRE CONNECTOR

(75) Inventors: William Hiner, Fallon, MO (US); Lloyd Herbert King, Jr., Jupiter, FL (US); James Keevan, O'Fallon, MO (US); Frank Vlasaty, St. Louis, MO (US); Steven Rhea, St. Peters, MO (US)

(73) Assignee: The Patent Store LLC, O'Fallon, MO (US)

( * ) Notice: Subject to any disclaimer, the term of this patent is extended or adjusted under 35 U.S.C. 154(b) by 267 days.

(21) Appl. No.: 12/455,865

(22) Filed: Jun. 8, 2009

(65) Prior Publication Data

US 2009/0283293 A1 Nov. 19, 2009

Related U.S. Application Data

(63) Continuation-in-part of application No. 11/515,465, filed on Sep. 1, 2006, now Pat. No. 7,560,645, which is a continuation-in-part of application No. 11/249,868, filed on Oct. 13, 2005, now abandoned.

(51) Int. Cl.
*H02G 15/08* (2006.01)

(52) U.S. Cl. ........................................................ 174/87

(58) Field of Classification Search ..................... 174/87
See application file for complete search history.

(56) References Cited

U.S. PATENT DOCUMENTS

| | | | | |
|---|---|---|---|---|
| 3,902,005 | A * | 8/1975 | Norden | 174/87 |
| 4,112,251 | A * | 9/1978 | Scott | 174/87 |
| 5,514,836 | A * | 5/1996 | Delalle et al. | 174/87 |
| 6,478,606 | B1 * | 11/2002 | McNerney et al. | 439/415 |
| 6,914,191 | B2 * | 7/2005 | Leith et al. | 174/87 |
| 7,560,645 | B2 * | 7/2009 | King et al. | 174/87 |
| 2002/0050387 | A1 * | 5/2002 | Blaha et al. | 174/87 |

* cited by examiner

*Primary Examiner* — Chau Nguyen
(74) *Attorney, Agent, or Firm* — Jacobson & Johnson LLC

(57) ABSTRACT

A twist-on wire connector having a finger friendly cushion cover that covers not only the normal hand gripping region but at least part or all of the normal non-hand gripping region of the twist-on wire connector so that regardless of the way the twist-on wire connector is grasped the user fingers engage the cushion cover to inhibit finger and hand injury and fatigue from repeated securement of twist-on wire connectors as well as twist-on wire connector with enhanced gripping.

20 Claims, 13 Drawing Sheets

FIG. 4D
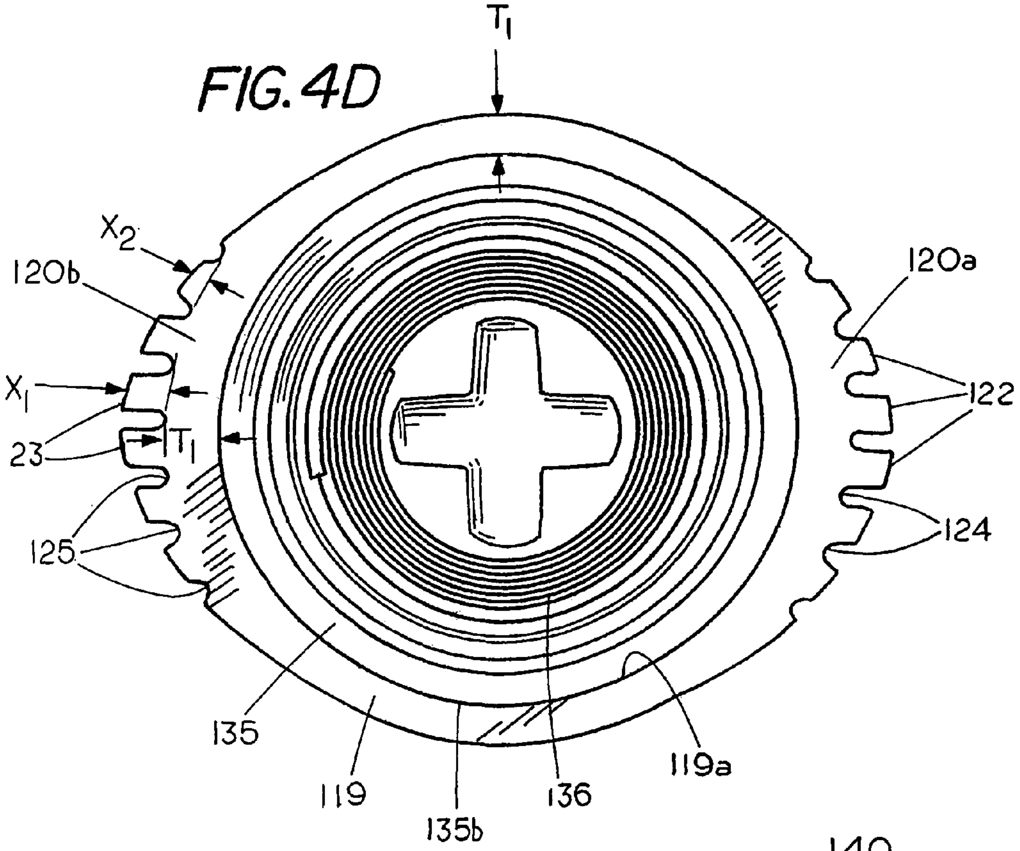
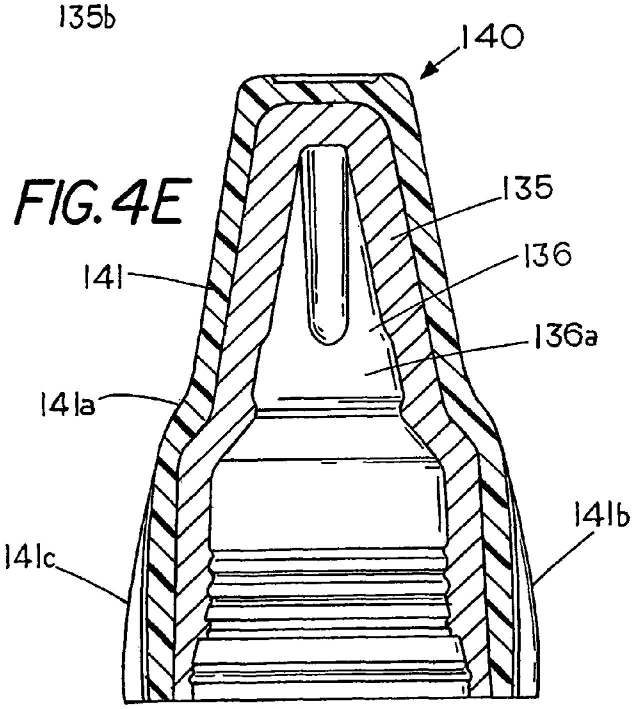
FIG. 4E

CUSION GRIP TWIST-ON WIRE CONNECTOR

CROSS REFERENCE TO RELATED APPLICATIONS

This application is a continuation in part of U.S. patent application Ser. No. 11/515,465 titled Twist-on Wire Connector Filed Sep. 1, 2006 now U.S. Pat. No. 7,560,645 which is a continuation in part of U.S. patent application Ser. No. 11/249,868 filed Oct. 13, 2005 now abandoned titled Cushioned Wire Connector.

FIELD OF THE INVENTION

This invention relates generally to twist-on wire connectors and, more specifically, to a finger friendly twist-on wire connector with enhanced gripping that provides three-axis deflection regardless of the users finger position.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of twist-on wire connector with a cushioned grip is known in the art, more specifically Blaha U.S. Pat. No. 6,677,530 discloses numerous embodiments of twist-on wire connectors and points out that the cushioned grip is on a portion of the exterior hard or rigid shell with the cushioned grip being an olefinic thermoplastic vulcanizate sold under the name Santoprene®, a trademark of Advanced Elastomer system of Akron, Ohio. Blaha describes a twist-on wire connector wherein the exterior of the wire connector shell has three main areas, a closed end section, a skirt and a grip mounting portion. The grip mounting portion is the region the user engages with his or her fingers in order to twist the wire connector into engagement with an electrical wire or wires.

Blaha points out that with molds of particularly close tolerances, such as found in the Twister® wire connector a cushioned grip can be formed over the Twister® wire connector without the use of boundary edges. The twist-on wire connector with a cushioned grip on the grip mounting portion is sold by Ideal Industries Inc. under the name Twister®PRO and is shown in the web page downloaded from the Ideal Industries which is included with the 1449 material information statement of the present application.

Blaha points out the problem of installing twist-on wire connectors with a hard shell is that if numerous connections are made the hard plastic surface can be painful on the fingers or in certain instances the shell surface can be slippery due to the sweat or soil on the users hand. As a solution to the problem Blaha proposes to place a cushioned material over the hand gripping portions of the wire connector to make the wire connector more comfortable to grasp. While Blaha recognizes that the placement of cushion on the grip mounting portion of the twist-on wire connector can reduce fatigue Blaha does not recognize that not everyone grasps the twist-on wire connectors in the same manner or that because of cramped conditions it might not be possible to grasp the twist-on wire connector on the grip mounting portions to enable the user to benefit from the cushioned grip of Blaha. Consequently, while the Blaha twist-on wire connector has a cushioned grip it can be of little benefit to those users who do not grip the twist-on wire connector on the normal designated gripping portions or those users who might have to apply a twist-on wire connector in a location with inadequate space to position the users hand or fingers around the normal hand gripping regions of the twist-on wire connector. While Blaha U.S. Pat. No. 6,677,530 shows multiple embodiments of his cushioned grip in each of his embodiments he places his cushioned grip at the base or open end of his wire connector while leaving the end section of his wire connector proximate the closed end of the wire connector with the hard shell exposed. Ironically, if the twist-on wire connector is to be applied in a tight location it is the uncushioned end section which the user grasps to twist the wire connector onto the wires. Since the end section usually has a smaller radius than the base or normal finger grasping portion an increased hand or finger pressure is required to obtain necessary torque to apply the twist-on wire connector. Thus, when application conditions are the most difficult one not only does one not have the benefit of cushioned grip for the users fingers but one has to generate greater hand force on the twist-on wire connector to obtain the necessary torque to bring the wire connector into engagement with the electrical wires therein.

Krup U.S. Pat. No. 3,519,707 illustrates another type of twist-on wire connector wherein a vinyl shield with ribs is placed around an exteriors surface of rigid cage that has sufficient strength and rigidity to drive the spring onto a cluster of wires. Krup states the purpose of his vinyl shell around the rigid case is to insulate and protect the connector and the wire connector. However, Krup fails to teach that the vinyl shell located around his rigid cage comprises a cushioned surface.

McNerney U.S. Pat. No. 6,478,606 shows a twist-on wire connector with a tensionally-biased cover. McNerney fits a sleeve of heat shrinkable material over a portion of his wire connector so that after a wire connection is made the heat shrinkable material can be shrunk fit around his connector to improve the bond to his connector and around the wires in order to prevent contaminants from entering the wire splice in his wire connector. In order to have ridges for gripping McNernery points out a tube of heat shrinkable material tightly grips his hard shell so as to replicate the grooves in the hard shell of his connector. Unfortunately, tightly shrinking the material around the body of connector introduces a circumferential bias or tension force in the heat shrunk material thus rendering material which may even be soft into a covering that is hard to the touch and is reluctant to yield to finger torque. Thus the heat shrunken tube on the body of his wire connector produces an external surface that resists resilient displacement and is also hard and is uncomfortable in response to the finger and hand pressure of the user since the tension and bias forces introduced by the heat shrinking limit the yielding of his material. That is, by stretching the material around the connector McNerney biases the material much like a spring under tension has an inherent bias. The bias introduced by the heat shrink process can prevent heat shrunk material from yielding equally in all three axis. Consequently, the heat shrinkable material in effect becomes like a stretched spring, which has increased resistance to stretching. The effect is to form an elastomer material into a hard cover or non resilient cover on a hard shell since a heat shrunk cover is limited in its ability to absorb external finger pressure. In addition any protuberances on the hard shell are carried through and become hard protuberances on the heat-shrunk layer. McNerney espouses the hardness of his heat-shrunk cover by pointing out that heat shrinking can produce a rigid case for his coil spring. In contrast to McNerney the present invention provides a cover to a twist-on wire connector that eliminates the problems generated by McNerney heat shrunk cover.

SUMMARY OF THE INVENTION

Briefly, the invention comprise a twist-on wire connector having a free standing cover that extends over the normal hand gripping region and at least part or all of the normal non-hand gripping region of the twist-on wire connector so that regardless of the manner the twist-on wire connector is grasped the user fingers engage a resilient cover to inhibit finger and hand injury and fatigue from repeated securement of twist-on wire connectors to electrical leads.

The invention provides an improved twist-on wire connector wherein the entire exterior portion of the shell, which might come into contact with the users hand or fingers, comprises a resilient grip that has multiple degrees of responsiveness to finger pressure. That is, the cover can resiliently compress radially inward to accommodate squeezing pressure from the user's fingers and can circumferentially and axially deflect through the shear resistance of the material to thereby comfortably accommodate the lateral twisting forces on the external surface regions of the cover. Consequently, for those persons who do not grasp the twist-on wire connector on the designated hand gripping regions or those users who normally grasp the wire connector on the designated hand gripping regions but because of cramped conditions or personal preferences, which require them to grasp only the end section of the wire connector, can now have the benefit of a cushioned grip for their fingers regardless of how they have to grasp the twist-on wire connectors during the connection process.

In one example of the invention a rigid core with rigid ears that can be engaged through the cover to enhance the torque that can be applied to the twist-on wire connector without injuring or fatiguing the users fingers.

A further feature of the invention is the surface securement of the finger friendly cover to the wire connector hard shell which allows one to retain the inherent characteristics of the resilient cover since internal forces are not introduced into the cover as a result of securement of the cover to the wire connector.

A further feature is that the use of a cushion cover over the entire exterior portion of the shell that a user's fingers can come into contact with provides an added benefit as the cushion covered twist-on wire connector is pushed back into the junction box. That is, the exterior surface of the twist-on wire connector can contact or rub against the insulation on the electrical wires as the wire connector is forced into the junction box. With the use of a resilient material or cushion cover on the exterior surface of the twist-on wire connector it reduces or inhibits the opportunity to accidentally damage the insulation on the other wires if the twist-on wire connector contacts or rub against the electrical insulation on the other wires.

A further benefit of having a cushion cover on the exterior surface of the connector hard shell is that it insures that the operator can apply maximum finger torque to the twist-on wire connector. That is, if the twist-on wire connector has a hard surface or a surface that is partly covered with a softer covering the tendency exists for the user to limit the torque due to the harsh engagement of the user's fingers with the hard portions of the shell of the twist-on wire connector. Because the present invention uses a cushion on the exterior portion of the shell the problem of torque limitation due to an operator consciously or unconsciously holding back on the twisting torque because of harsh contact between fingers and a hard portion of the twist-on wire connector is eliminated. As a result one can generally obtain more clamping force on the wire junctions in the wire connector which results in a cooler junction between the wires in the twist-on wire connector.

A further benefit of the cushion cover is that when the cushion cover cantilevers over an internal edge of the rigid shell the cushion cover can coact with the internal edge in the twist-on wire connector to form a pad over the internal edge which both protects the users fingers as well as enables the user to enhanced his or her grip of the twist-on wire connector.

A further benefit is that the cushion cover on the exterior portion of the shell can provide extra electrical insulation. That is, in certain applications one may want to handle higher voltages. With the exterior portion of the shell covered with a resilient material that has enhanced electrical insulating qualities one can provide a twist-on wire connector suitable for a wider range of voltages.

A further benefit is that wire connectors having heat shrinkable materials on the hard shell of the wire connector can also be made finger friendly. That is, the biased of the heat shrunk material can be overcome by placing a layer of surface secured resilient material over the heat shrunk material to form a cushion cover over the heat shrunk material.

A further benefit of the invention is that the cover can be formed with flexible ribs formed entirely from the resilient material of the cover.

BRIEF DESCRIPTION OF THE DRAWINGS

FIG. 4D is a bottom view of the twist-on wire connector of FIG. 4;

FIG. 4E is a side sectional view of a preferred embodiment of a twist-on wire connector with an annular shoulder;

DESCRIPTION OF THE PREFERRED EMBODIMENT

The cushioned grip twist-on wire connectors of FIGS. 1-25 show various examples of cushioned grip twist-on wire connectors having a cushion cover that allow a user to comfortably grasp and rotate a twist-on wire connector regardless of the portion or portions of the connector contacted by the user's finger or hand. The cushioned grip twist-on wire connectors also includes examples of cushioned grip connectors that enable a user to enhance the torque to the twist-on wire connector without the use of tools.

Figure 1:
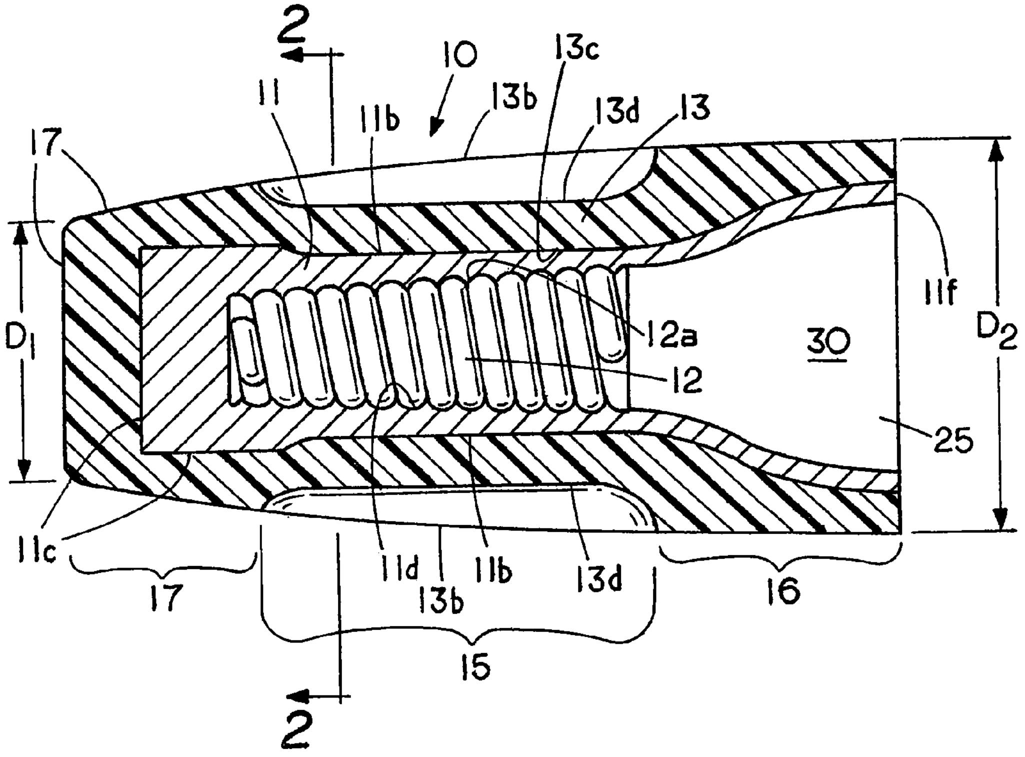
FIG. 1 is a section view of a twist-on wire connector with a cushion cover.
Figure 2:
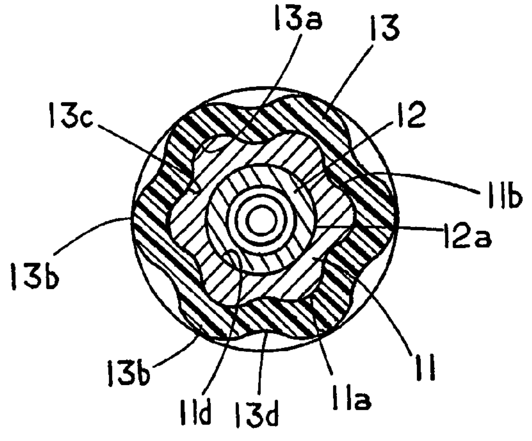
FIG. 2 is a section view of a twist-on wire connector of FIG. 2 taken along lines 2-2 of FIG. 1.

Referring to the drawings, FIG. 1 shows a cutaway view of a wingless, twist-on wire connector 10 having a closed end and an open end for insertion of electrical wires therein and FIG. 2 shows a section view taken along lines 2-2 of FIG. 1.

Wire connector 10 includes a rigid internal shell or sleeve 11 with an open end 25 and a closed end, the shell having an interior surface 11*d* for engagement with wire coil 12 and an over molded soft shell or cushion cover 13 with a closed end an open end 25. The hard shell 11 is conventionally used on the exterior of twist-on wire connectors and usually contains ribs, reliefs, grooves or wings to enhance the users grip of the twist-on wire connector. That is, to apply a twist-on wire connector the user rotates the twist-on wire connector with one hand while the wires are held firmly in the other hand. The result is that the wire ends are twisted into electrical engagement with each other in the spiral thread of the twist-on wire connector.

Located circumferentially around and encapsulating the closed end and the circumferential portion of hard shell 11 is an over molded layer or cushion cover 13 that provides a cushioned surface on the exterior of hard shell 11. FIG. 1 shows cushion cover 13 includes a normal circumferential hand gripping region 15, a circumferential base 16 and an end section 17. FIG. 2 shows that when the cushion cover 13 is molded over the hard shell 11 the ridge 11*a*, the grooves or relief regions 11*b* on the hard shell 11 are carried through and become part of the cushion cover 13 through corresponding ridge 13*b* and groove 13*d* therein. FIG. 2 also illustrates how the circumferential spaced grooves 11*a* and ridges 11*b* mate with corresponding ridges 13*b* and grooves 13*c* of cushion cover 13 to form a mechanical interlock therewith as the ridges and grooves are carried into the cushion cover 13.

Circumferential base 16 is not normally used as a hand gripping region but can be used as a hand gripping region in those instance when greater hand torque is required since the diameter $D_2$ is generally larger than the end diameter $D_1$. In some cases the base 16 is provided with grooves or wings to enable a user to apply greater hand torque to the wire connector. On the other hand end section 17 on the closed end is considered a normal non-hand gripping region. One of the reasons end section 17 is considered a non hand gripping region 17 is that in conventional hard shell twist-on wire connectors rigid end can be used for securing a tool thereto to aid in tightening the twist-on wire connector 10; however, as Blaha points out most electricians do not bother to use a tool since the fingers are the quickest most convenient way to secure a twist-on wire connector but he still maintains the ends of his hard shell free of any cushioned material thereby allowing one to use a tool on the end of his hard shell.

FIG. 1 shows the open end of rigid shell 11 includes an annular end surface 11*f* and a chamber 30 thereon for encompassing the wires that are in engagement with the spiral thread which can be formed from a wire coil 12 or in some instances can be integral to and with the hard shell of the twist-on wire connector. The normal hand gripping region 15 of shell 13 contains a set of longitudinally extending elongated ribs 13*b* and longitudinally extending elongated reliefs 13*d* that are positioned proximate to each other to enhance a user grip with the ribs 13*b* and reliefs 13*d* located on the central portion of wire connector 10. Located on an interior surface of hard shell 11 is a spiral thread formed from a wire coil 12. Wire coil 12 is secured to shell 11 so that rotation of shell 11 carries wire coil 12 therewith.

In the embodiments shown in FIG. 1 and FIG. 2 a resilient material, such as an elastomer forms the cushion cover 13. The cushion cover 13 extends from the open end 25 to and over the closed end 11*c* of the hard shell 11. That is, the elastomer 13 extends from an open end 25 of wire connector 10 to encompass the closed end of hard shell 11. The cushion cover 13 comprising an overlayer of soft to the touch material that includes a normal hand gripping region 15, a circumferential base region 16 as well as portions or all of the normal non-hand gripping regions 17 which cover the closed end 11*c* of the wire connector 10. The cushion cover 13 comprises a layer of resilient material having sufficient compressibility so as to flex to provide a cushion to a user's fingers or hand as the user squeezes thereon but sufficient strength so as not to tear when hand torque is applied to the cushion cover 13 as the twist-on wire connector is secured to a set of wires. That is, the cushion cover 13 has sufficient shear strength so as to resist separating as the user grasps the cushion cover 13 to rotate, the cushion cover 13, the rigid shell 11 and the wire coil 12 as a unit. As can be seen in FIG. 1 and FIG. 2 the cushion cover 13 of resilient material includes not only the normal hand gripping region 15 and the base 16 but also the end section 17, which is normally provided with a hard shell so that a tool can be used to engage the end of the twist-on wire connector. However, one of the field difficulties in applying a twist-on wire connector is not in the torque required but it is the location that necessitates how the wire connector is grasped. For example, when connecting a wire connector to existing leads in junction box there maybe a short length of wire to work with as well as a tight or cramped space to apply the wire connector. In those instance the user may only be able to grasp the end of the wire connector 10 in the normal non-hand gripping region 17 or partially on the normal hand gripping region 15 and partially on the normal non-hand gripping region 17 in order to twist the wire connector into engagement with the wires. With the present invention, if the user's fingers engage the normal non-hand gripping region 17, which contains the cushion cover 13, the user is still provided with a cushioned finger support. Thus, with the present invention the user is provided a cushioned surface to grasp regardless of a grasping orientation of the twist-on wire connector. Ironically, it is the end section or the non-hand gripping region that is most difficult to grasp and twist since the twist-on wire connectors are conventionally made with the closed end smaller than the open end thus requiring a user to generate a large twisting force to obtain the necessary torque for securing the wire connector on a set of wires.

Thus, the cushion cover 13 comprises a layer of tensionally unbiased resilient material secured to and extending over the exterior surface of the hard shell 11 one forms a finger friendly cover with the layer of resilient material providing three axis deflection with sufficient compressibility so as to comfortably compress in response to radial finger pressure and to laterally deform in response to finger torque regardless of a finger grasping position on the cushion cover 13. By having a layer of cushion material having sufficient shear resistance so as to resiliently yield without tearing when a hand torque is applied to the cover one is assured that the wire connector can be comfortably applied with hand or finger torque.

Figure 2A:
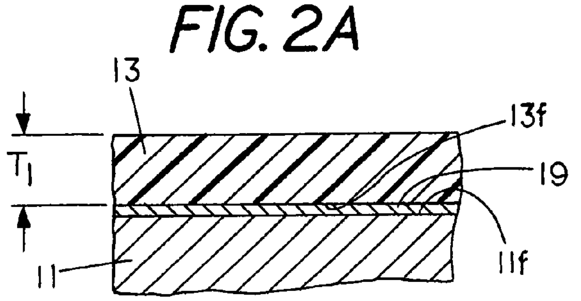
FIG. 2A is a partial sectional view of a cushion cover which is surface secured to a twist-on wire connector with the cushion cover in a relaxed state.
Figure 2B:
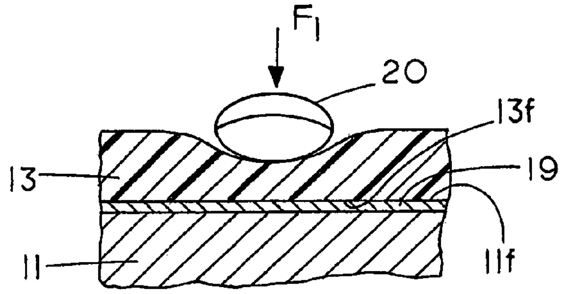
FIG. 2B is a partial sectional view of a cushion cover secured to a twist-on wire connector of FIG. 2A with the cushion cover in a partially compressed state.
Figure 2C:
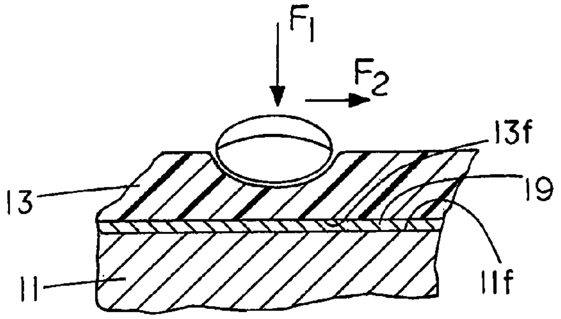
FIG. 2C is a partial sectional view of a cushion cover secured to a twist-on wire connector of FIG. 2A with the cushion cover also in a shear condition.

FIGS. 2A-2E illustrate surface securement of a cushion cover 13 to a hard shell in a manner that allows the inherent characteristics of the cover 13 to be retained. A reference to FIGS. 2A, 2B and 2C shows a portion of the hard shell 11 and a portion of the resilient cover 13 in various states. FIG. 2A shows the cushion cover 13 in a tensionally unbiased condition with cushion cover 13 secured to hard shell 13 by surface securement through a layer of adhesive 19 that extends along the interface between the surface 11*f* of hard shell and an internal surface 13*f* of cover 13. In the condition shown in FIG. 2A the body of cover 13, which is denoted by $T_1$, is in a free standing state or an unbiased condition and is responsive to lateral or radial forces in any direction since the only securement of the cushion cover to the hard shell 11 is through a surface securement of surface 13*f*. By free standing, as used herein, it is meant that the material comprising the cover is substantially devoid of any internal tension forces that would limit the deflection of the elastomer as opposed to heat shrunk material which contains internal tension forces induced as a result of the heat shrinking process. FIG. 2B shows a finger 20 exerting a downward force $F_1$ that causes the cushion cover 13 to resiliently respond to the radial pressure by deflecting radially inward.

FIG. 2C shows what occurs when a rotational twisting force is also introduced onto the cover 13. The twisting force $F_2$ brings the cover 13 into a shear condition wherein the shear resistance of the material comprising the cover 13 provides a resilient deflection of the cover 13. As the cover 13, as illustrated in FIG. 2A, is in an unbiased condition the cover is free to yieldable respond to laterally twisting forces as well as radially compressive forces thus providing the user with a comfortable gripping action on the wire connector.

Figure 2D:
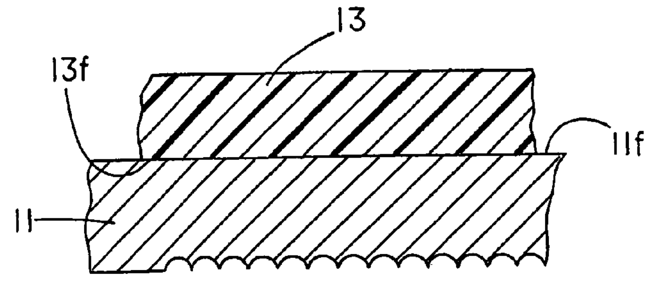
FIG. 2D is a partial sectional view of a cushion cover molded to a twist-on wire connector with the cushion cover in a relaxed state.

FIG. 2D is a partial sectional view of a cushion cover 13 molded to a twist-on wire connector 11 with the cushion cover in a relaxed or free standing state since no internal forces have been generated in the cover. In this embodiment the surface securement is obtained by having the under surface 13*f* of cushion cover 13 secured directly to the exterior surface 11*f* of hard shell 11 while the body of the cushion cover is in a free standing state. The surface securement shown in FIG. 2D can be obtained by molding the layer of cushioned material 13 directly to the surface 11*f* of the hard shell 11. Having the cushion cover 13 in the relaxed or unbiased state places the cover in a condition to respond to gripping forces in any of the three axis as there are no bias or tensional forces to overcome.

Figure 2E:
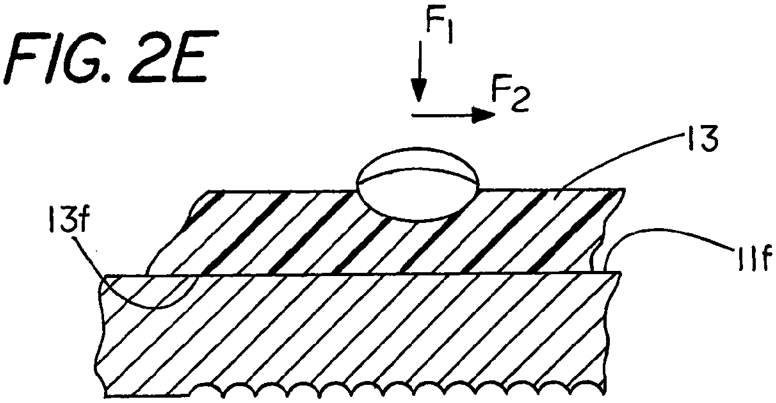
FIG. 2E is a partial sectional view of a cushion cover molded to a twist-on wire connector of FIG. 2D with the cushion cover in a shear and compressed condition.

FIG. 2E is a partial sectional view of a cushion cover 13 molded to a twist-on wire connector 11 of FIG. 2D with the cushion cover in a gripped condition. In the gripped condition the cushion cover is in a shear condition as indicated by the force arrows $F_2$ and in a compressed condition by the force $F_1$. As bias or tensional forces from heat shrinking or the like are not present the full resiliency of the material comprising the cushion cover 13 can be used to provide a cushion to the users fingers.

Figure 3:
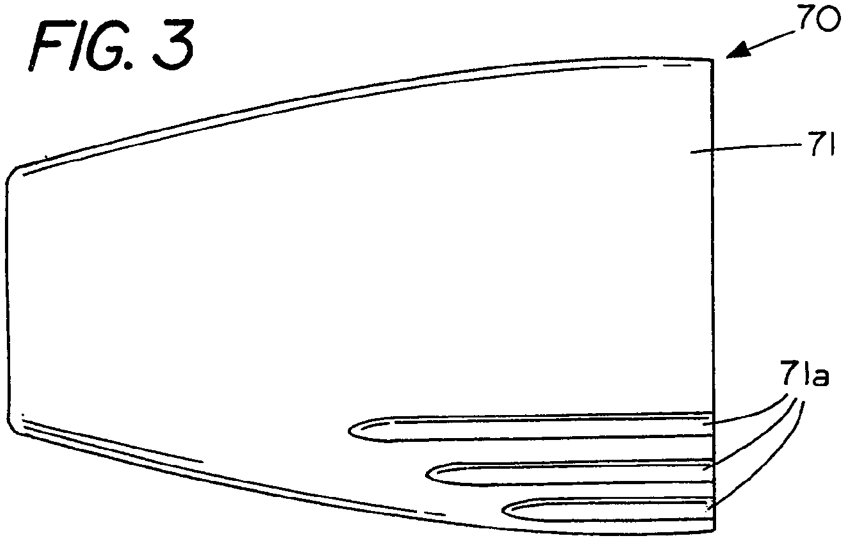
FIG. 3 is front view of the twist-on wire connector with the cushion cover having a set of protrusions with grooves therein.

FIG. 3 is front view of the twist-on wire connector 70 revealing a set of grooves 71*a* extending parallel along the cushion cover 71 which to provide an enhanced grasping region.

Figure 3A:
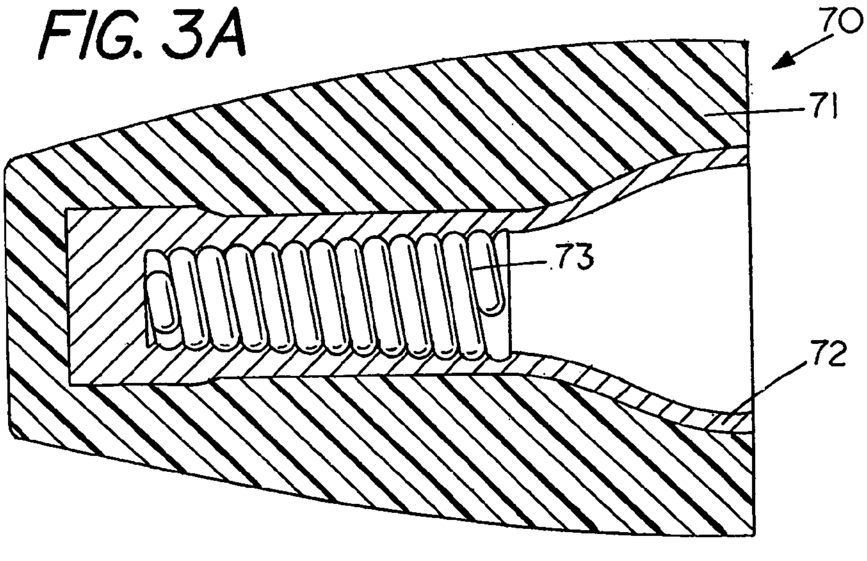
FIG. 3A is a sectional view of a twist-on wire connector of FIG. 3.

FIG. 3A is a sectional view of a twist-on wire connector 70 with a cushion cover 71 located externally to a hard shell or sleeve 72 which harbors a spiral wire coil 73.

Figure 3B:
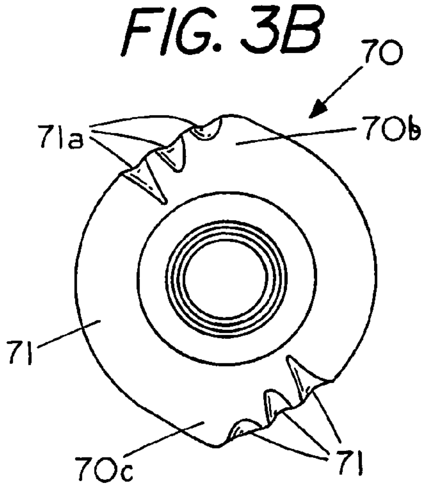
FIG. 3B is a top view of the twist-on wire connector of FIG. 3.

FIG. 3B is an end view of the twist-on wire connector 70 having an elliptical end shape. The cushion cover 71 has an enhanced gripping region 71 including a lobe 70*b* on one side of the twist-on wire connector and a lobe 70*c* on the opposite side of the cushion cover 71. A set of grooves 71*a* are located in lobe 70*b* on one side of cushion cover 71 and a second set of grooves 71*c* are located on lobe 71*c* on the diametrical opposite side of cushion cover 71. In this embodiment the hard shell 72 can be kept free of wings or ridges to further ensure the operator can apply a twist-on wire connector with as little finger fatigue as possible as the external lobes of the cushioned material can be used to aid in grasping and twisting the wire connector into electrical engagement. In this embodiment the cushion cover 71 is provided with enhanced gripping regions partly through the use of a non-circular base shape as well as the use of the lobes 70*b* and 70*c*. Cover 71 is a one piece wherein the cover has a base thickness greater in a first axis then in an orthogonal axis to form integral lobes 70*b* and 70*c*.

Figure 4:
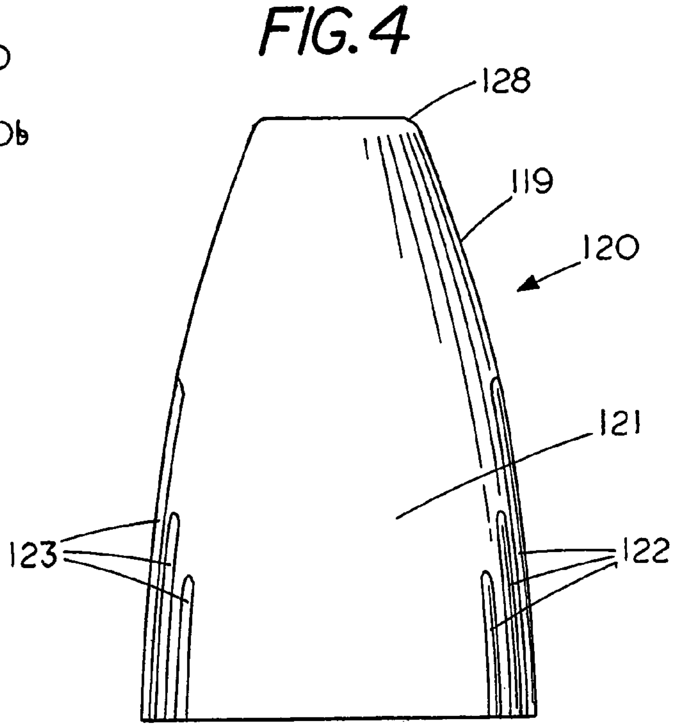
FIG. 4 is a front view of a twist-on connector having flexible ribs proximate the base.
Figure 4A:
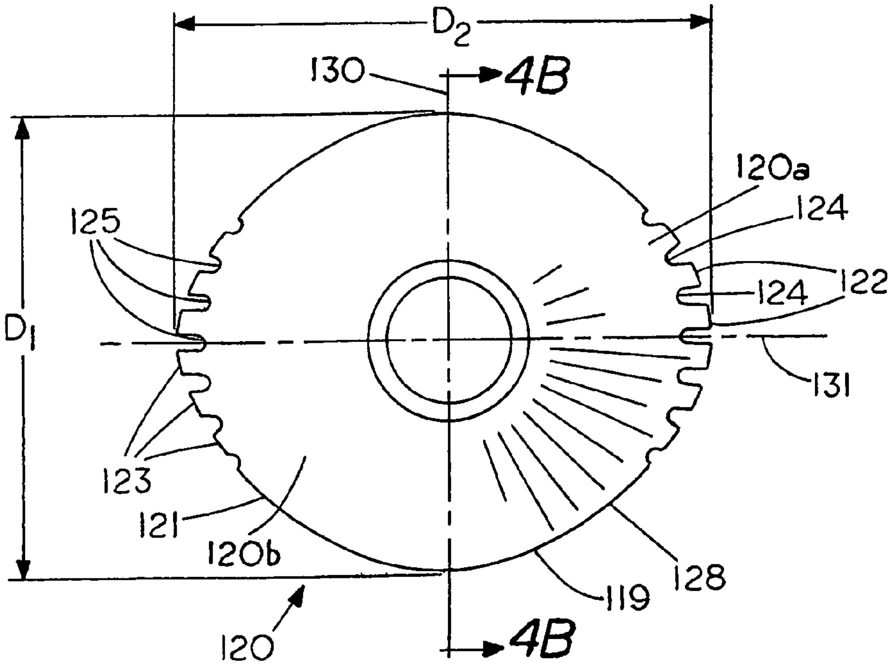
FIG. 4A is a top view of the twist-on wire connector of FIG. 4.

FIG. 4 shows a front view of a covered twist-on wire connector 120 having a cushion cover 119, a top or closed end 128 and a base 121 having a non-circular shape. Located in base 121 and diametrical opposite to each other are a first set of axially extending elongated tapered ridges or ribs 122 and a second set of axially extending elongated tapered ridges or ribs 123. FIG. 4A shows cover 120 is a one-piece cover wherein the cover has a base thickness greater in a first axis 131 then in an orthogonal axis 130. In this embodiment ribs 122 and 123 are formed on the integral lobes. By having the lobes with ribs therein it provides an enhanced cushion effect in the hand gripping region since the ribs 122 and 123 are located on top of a layer of resilient material. Thus, a twist-on wire connector is provide with two different levels of cushion support, a normal cushion of resilient material over the normal non-hand gripping regions and a greater cushion located over the conventional hand gripping region of the twist-on wire connector to allow the cushion itself to function as a rib.

FIG. 4A shows a top view of the covered wire connector with the cover 119 including a first integral lobe 120*a*, a second integral lobe 120*b*, a circular top or closed end 128, and an elliptical shaped base 121 having a major diameter $D_2$ which extends along major axis 131 and a minor diameter that extends along axis 130. Located on one side of cover 119 is the first set of flexible ribs 122 that are separated by a set of axially extending grooves 124 and located on the other end of cover 119 are a second set of flexible ribs 123 separated by a set of axially extending grooves 125.

Figure 4B:
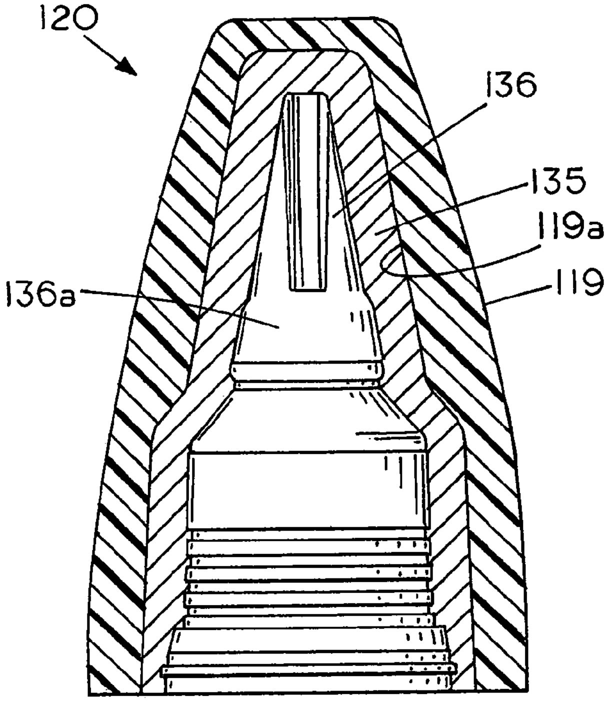
FIG. 4B is a section view of the twist-on wire connector of FIG. 4.

FIG. 4B shows a partial sectional view of cover 119 revealing the hard shell or sleeve 135 extending between the exterior surface 136*a* of the spiral core 136 and the cushion cover 119. In this embodiment the cushion cover 119 varies in thickness to provide the dome-shaped appearance shown in FIG. 4.

Thus, as shown in FIG. 4-FIG. 4D, the wire connector 120 can have an insert with a hard shell 135 having a circular cross-sectional shape. To aid in the rotation of the twist-on wire connector the cover has been provided with lobes 120*a* and 120*b* that can carry flexible ribs 122 and 123. The lobed cover allows one to introduce longitudinally extending ribs that are completely formed from the resilient material in the cover. As a consequences the uncomfortable projection of an underlying rigid rib or rigid wing is eliminated since the hard shell contains no radially extending projections that would feel uncomfortable to the user even if covered with a cushion material.

Figure 4C:
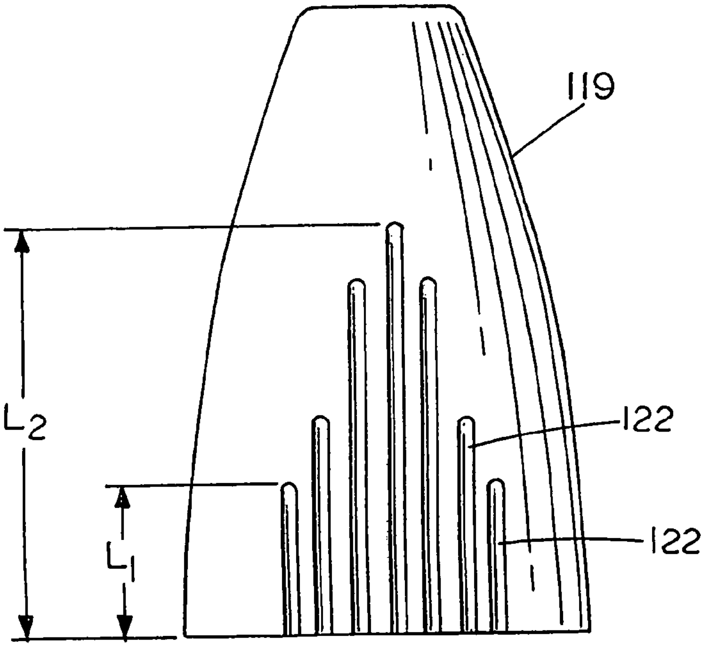
FIG. 4C is a side view of the twist-on wire connector of FIG. 4.

FIG. 4C shows a side view of the wire connector 120 revealing the elongated ribs 122 that curvedly extend along the outer surface of the cover 119. The ribs extend from a distance $L_1$ on the outer ribs to a distance $L_2$ on the central rib thus providing greater finger rib engagement as the diameter of the base increases.

The cushion cover 119 and others described herein are preferable made from materials that are resilient to provide comfort when gripped by the user. One example of one such type of material is a thermoplastic elastomer. Thermoplastic elastomers are commercially available and are well suited under wet conditions since it has good gripping characteristics even when wet. Examples of other suitable materials suitable include silicone rubber.

Thus, the twist-on wire connector 120, as shown in FIG. 4-FIG. 4D includes a hard shell 135 having a closed end 135*a*, a face 135*b* which is free of radial extending rigid projections such as ribs and wings and an open end 135*c* with a spiral core 136 located in the hard shell 135 to comprise the twist-on wire connector. In order to provide a cushion to the users hand or fingers located exterior to the hard shell 135 is a cover 119 comprising a body of a free-standing resilient material which can be an elastomer or the like that 119 completely encapsulates closed end 135*a* and circumferential face 135*b* of the hard shell, with the resilient material having an internal surface 119*a* fixedly secured to the spiral core 119 so that finger forces on the free-standing resilient material 119 allow the body of free-standing resilient material to yield so as to provide a cushioned support to a users hand or fingers regardless of a grasping orientation on the cover of resilient material.

As shown in FIG. 4 the ribs 122 and 123 on the cover are located on the radially extending protuberances to facilitate rotation of the twist-on wire connector while FIG. 4D shows a bottom view of the cover showing the cover having a thickness $T_1$ that extends peripherally around the wire connector with lobes 120*a* and 120*b* containing the elongated flexible ribs 123 and 122 which lack an underlying hard base such as found in ribs or wings. That is, instead of attempting to cover rigid ribs or rigid wings to provide a cushion grip the embodiment of FIG. 4 forms an integral resilient lobe on diametrically opposite sides of the cover 119 and includes flexible ribs 122 and 123 as part of the resilient cover that extends over the hard shell 135 that is free of radial protuberances that could be felt through the cover 119. Thus as shown in FIG. 4A-4D the cover 119 is one piece wherein a base thickness of the cover is greater in a first axis then in an orthogonal axis to form integral lobes 120 *a* and 120*b* with each of the integral lobes including flexible ribs therein with the flexible ribs extended radially outward and unsupported by a rigid protrusion on the hard shell 135. As a result the cover can provide a soft or cushion feel to the user by using flexible ribs that are unsupported by rigid protrusions on the hard shell.

FIG. 4E shows a sectional view of a preferred embodiment of the wire connector 140 which is similar to the wire connector 120. In the embodiment of FIG. 4E the core 136 and the hard shell 135 are identical to the core and hard shell of connector 120, which is shown in section in FIG. 4B. The cushion cover 119 shown in FIG. 4B has an exterior surface that smoothly curves from a closed end to the open end of cover 141 while the cushion cover 141 shown in FIG. 4E has a uniform thickness over the exterior surface of the hard shell 135. Placing a cover of uniform thickness on the exterior surface of the hard shell 135 produces an annular shoulder 141*a* that extends around the wire connector 140 thus allowing one to use the shoulder 141*a* to axially force the wire connector onto the ends of wires. Extending radially outward from one side of wire connector 140 is a first set of integral elongated flexible ribs 141*c* and extending radially outward from the opposite side of wire connector 140 is a second set of integral elongated flexible ribs 141*b*. While the cushion cover with the annular shoulder is formed by conforming the cover of uniform thickness to the hard shell other methods of making an annular shoulder are within the scope of this invention.

Figure 5:
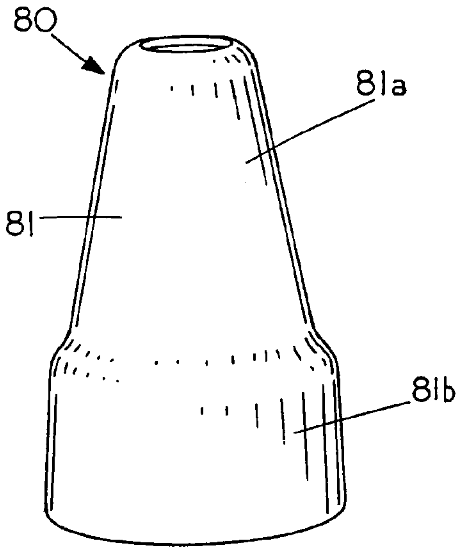
FIG. 5 is a perspective view of a twist-on wire connector without any ribs.

FIG. 5 is a perspective view of a twist-on wire connector 80 with an encapsulating cushion cover 81 that is free of any ribs. Wire connector 80 has a top frusto conical shape section 81*a* and a lower cylindrical section 81*b* to allow a person to grasp the cushion cover of the twist-on wire connector 80. The twist-on wire connector as illustrated in FIG. 5 is one piece and has a minimum thickness to provide a cushion cover, While the minimum thickness can vary with the resilient material with most resilient materials a minimum thickness of at least 0.020 inches is sufficient to provide a cushion cover with a preferred thickness range of 0.035 to 0.060 inches.

Figure 6:
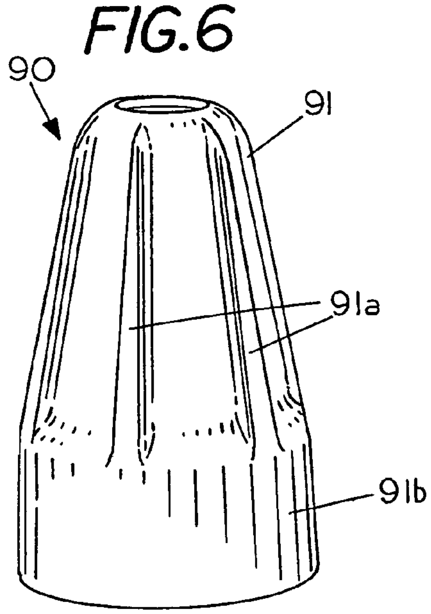
FIG. 6 is a perspective view of a twist-on wire connector with a set of equally spaced apart ribs.

FIG. 6 is a perspective view of a twist-on wire connector 90 with a cushion cover 91 containing a set of equally spaced apart ribs 91*a* and a smooth cylindrical base 91*b*. In the embodiment shown the ribs 91*a* have been formed directly into the cushion cover 91 on top of a hard shell that is free of protuberances such as wings or the like.

Figure 6A:
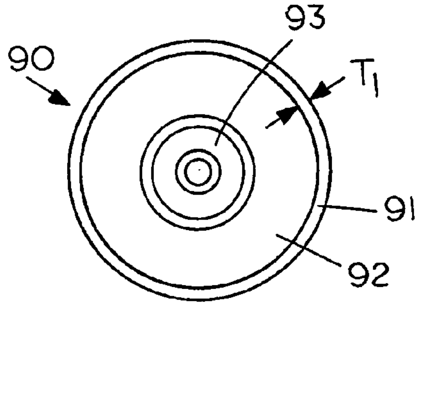
FIG. 6A is an end view of the twist-on wire connector of FIG. 6.

FIG. 6A is an end view of the twist-on wire connector of FIG. 6 showing the hard shell 92 with the spiral coil 93 secured therein. Located on the exterior surface of shell 92 and surface secured thereto is the cushion cover 91 having a thickness $T_1$ which is free of bias forces.

Figure 7:
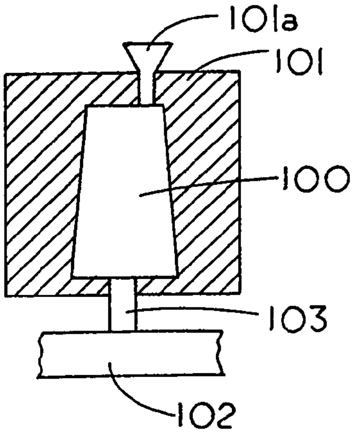
FIG. 7 shows a twist-on wire connector in a mold after forming an outer hard shell of the twist-on wire connector.

FIG. 7 shows a twist-on wire connector hard shell 100 being molded in a spilt mold 101 having an inlet 101*a* for introducing material to form the moldable shell 100. A mandrel 103 sets on a rail 102 that carries the shell 100. Once the shell 100 has been formed in mold 101 the mold 101 is opened to allow removal of the shell 100 by displacement of the rail 102, which supports the mandrel 103, the shell 100 can be placed in a further mold after forming an outer shell of the twist-on wire connector.

Figure 7A:
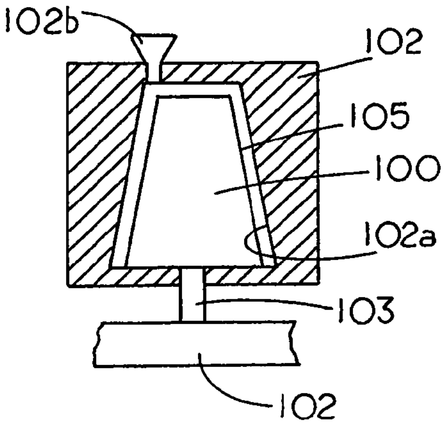
FIG. 7A shows the hard shell of the twist-on wire connector of FIG. 7 in a further mold in a condition to receive a molded over layer of cushioned material.

An alternate molding of the two layers of material comprise using a two component injecting molding machine wherein in the first step a layer of material such as the hard shell is formed in a first cavity in the mold, after cooling the mold is opened and the molded article is rotated and inserted into a second cavity in the mold where the second layer of molten material is applied over the first layer of molded material FIG. 7A shows the hard shell 100 of the twist-on wire connector of FIG. 7 in a further mold 102*c* having a mold inlet 102*b*. In this condition a gap 105 extends between the exterior surface of the hard shell 100 and the interior surface 102*a* of mold 102. The hard shell 100 is centrally supported by mandrel 103 and rail 102 in a condition to receive a molded overlayer of cushioned material by injection molten material into gap 105 through spout 102*b*. Thus in this embodiment the interior surface of the cushion cover is secured to the exterior surface of the hard shell by an overmolding process thus allowing one to form a cover that remains in an unbiased condition since only the surface of the cushion cover is secured to the hard shell.

Figure 8:
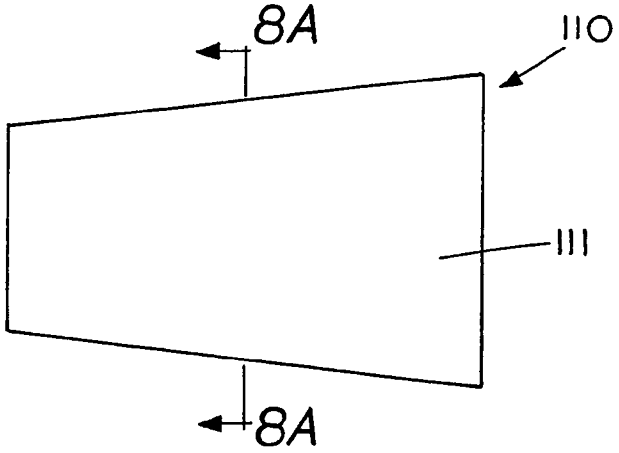
FIG. 8 shows a front view of an embodiment of a twist-on wire connector with a mechanical interlocked cushion cover.

FIG. 8 shows a front view of another example of a twist-on wire connector 110 that is surface secured through a mechanically interlocked cushion cover 111. In this embodiment the cushion cover is retained by a mechanical engagement of protrusions on the inner surface of the cushion cover 111 and recess in the hard shell, however, the material comprising cushion cover 111 remains in an unbiased or free standing condition.

Figure 8A:
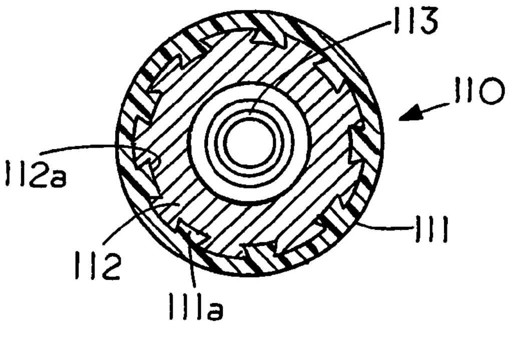
FIG. 8A shows a cross sectional view of the twist-on wire connector of FIG. 8 revealing the mechanical interlock.

FIG. 8A shows a cross sectional view of the twist-on wire connector 110 taken along liens 8A-8A of FIG. 8. In the embodiment shown a set of axially extending dovetail grooves or recess 112*a* are formed in the hard shell 112, which carries the spiral coil 113 therein. The cushion cover 111 contains a set radially extending dovetails 111*a* that interlock with the dovetail grooves 112*a* in the hard shell. In this embodiment a portion of the cushion cover is retained within the grooves; however, the cushion cover can still be retained in an unbiased condition since it is unnecessary to introduce bias forces into the cushion cover 111 to retain the cover on the wire connector.

Figure 9:
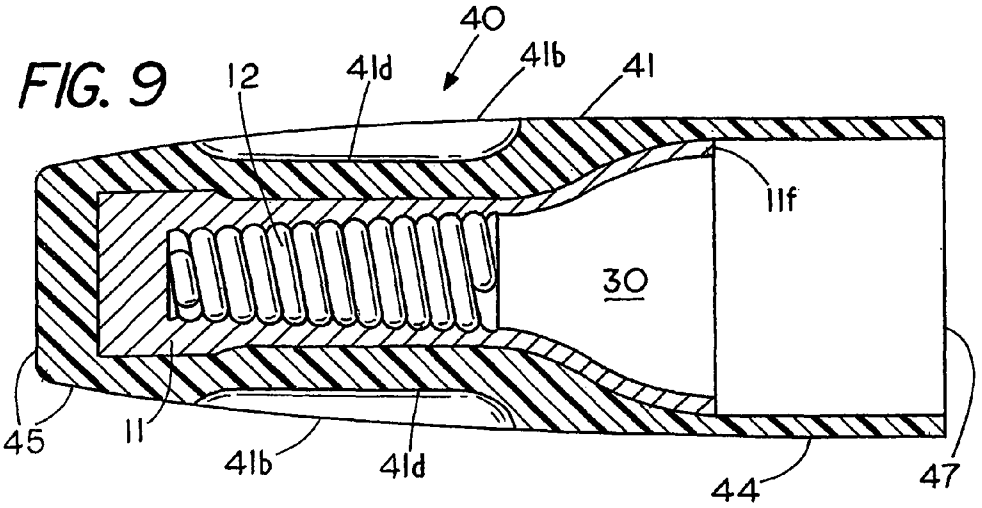
FIG. 9 is an alternate embodiment of the invention wherein the twist-on wire connector includes a skirt.

FIG. 9 shows an alternate embodiment of the invention wherein the shell or sleeve 11 and wire coil 12 are identical to those shown in FIG. 1 and FIG. 2; however, the cushion cover 41 extends beyond end 11*f* to provide an integral deformable skirt 44 with an open end 47 for insertion of wires therein. Deformable skirt 44 is unsupported by the hard shell 11. The use of a flexible skirt is shown in U.S. Pat. No. 5,142,494 wherein he attaches a separate flexible skirt to the hard body of his twist-on wire connector. However, with the embodiment of FIG. 9 the cushion cover not only covers the hard shell 11 it forms a one-piece cover with an integral deformable skirt.

Figure 10:
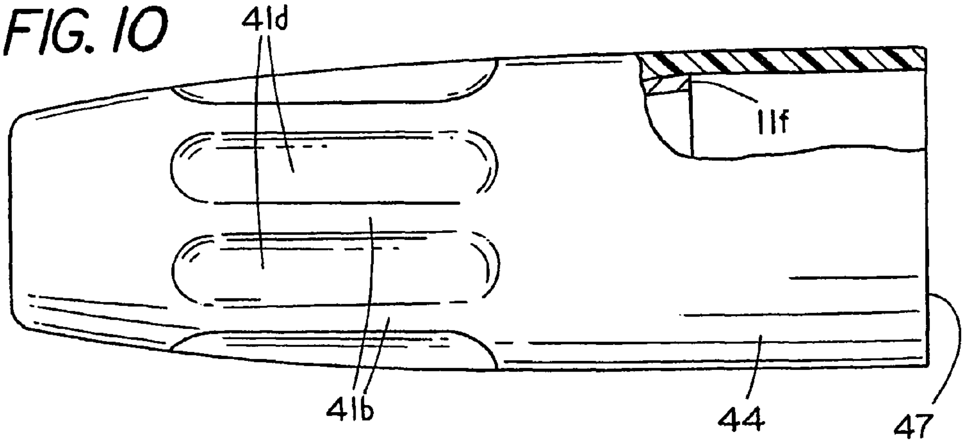
FIG. 10 is a partial cut-away view of the embodiment of FIG. 9.

FIG. 10 shows a partial cutaway view of the twist-on wire connector of FIG. 9 to reveal the exterior ridges 41*b* and grooves 41 that extend around the peripheral region of the central portion of wire connector 40.

Figure 11:
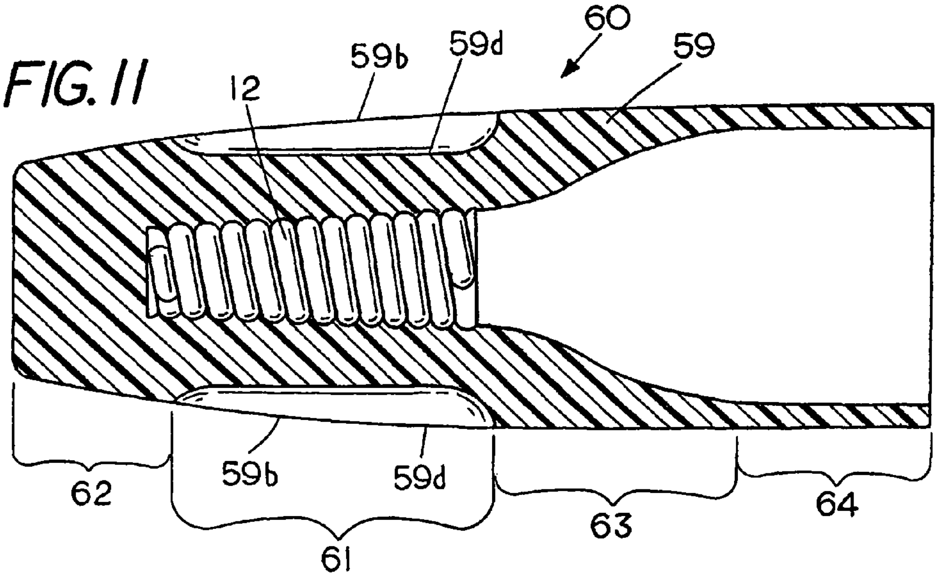
FIG. 11 is a partial sectional view of an alternate embodiment of a twist-on wire connector with a cushioned grip.

FIG. 11 shows an alternate embodiment of a cushion grip wire connector 60 having a one piece external cushion or shell 59 with a wire coil 12 secured therein. In the embodiment shown in FIG. 5 the internal hard shell has been dispensed with and replaced with a cushioned material 59. The cushion material comprises an electrically insulating material that flexes in response to finger pressure thereon to as to increase the contact area between the users fingers while avoiding edges that can cause pressure sores on a users fingers during repeated applications of the wire connector. In the embodiment shown in FIG. 5 the wire connector elastomer shell 59 is secured directly to the wire coil 12 with an adhesive or the like. The elastomer shell 59 surrounds the wire-engaging coil 12 with the elastomer shell including longitudinal ridge 59*b* and longitudinal grooves 59*d* to enhance a users grip. As the shell flexes in response to the user grasp the ridges and grooves provide tensional engagement with the users finger while at the same time providing a cushion so as minimize injury to the users fingers regardless of how the wire connector 60 is grasped.

In the embodiment shown in FIG. 11 the wire connector elastomer shell 59 is secured directly to the wire coil 12 with an adhesive or the like. The elastomer shell 59 surrounds the wire-engaging coil 12 with the elastomer shell including longitudinal ridge 59*b* and longitudinal grooves 59*d* to enhance a users grip. As the shell flexes in response to the user grasp the ridges and grooves provide tensional engagement with the users finger while at the same time providing a cushion so as minimize injury to the users fingers regardless of how the wire connector 60 is grasped.

Figure 23:
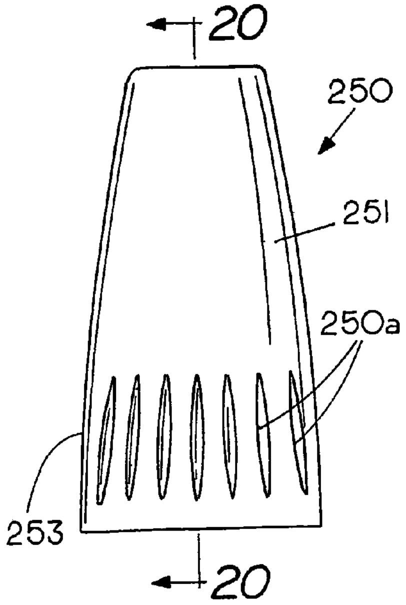
FIG. 23 shows a front view of a cushioned grip connector.
Figure 24:
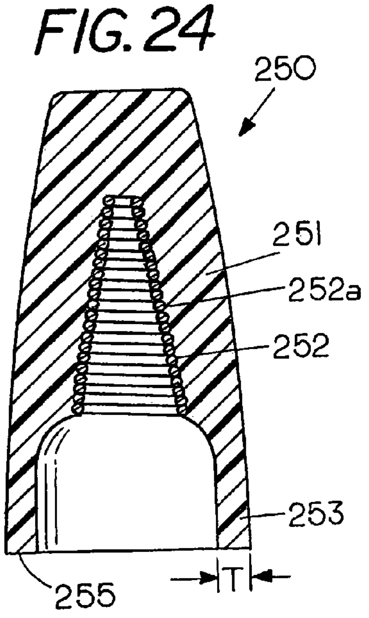
FIG. 24 is a cross sectional view of a cushioned grip connector of FIG. 23 without a separate sleeve.
Figure 25:
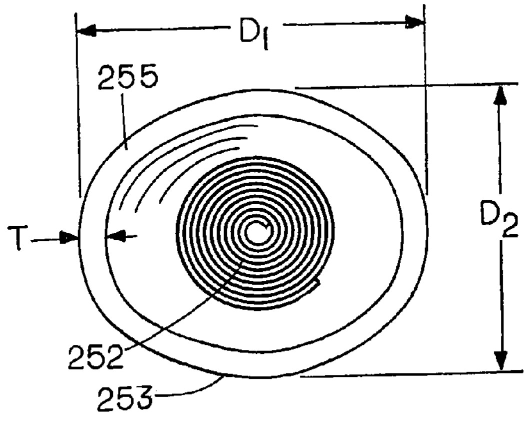
FIG. 25 is an end view of the cushioned grip connector of FIG. 23 in a deformed shape.

In the examples of FIGS. 1-11 the twist-on wire connectors include a resilient cushion cover supported by a rigid shell with the base of the wire connector having a permanently deformed shape such as an oval shape to enhance the application of torque to the twist-on wire connector. In contrast, FIGS. 12 to 25 include examples of shape deformable twist-on connectors that occupy lesser space and allow one to enhance the rotational torque by grasping the connector in a resilient finger gripping region and temporarily deforming the cover into an oval shape. In FIG. 12 to 22 some figures show a deformable cushioned grip twist-on wire connector that includes either a sleeve with an annular resilient base or a sleeve with an internal edge beneath a cushion cover. In some cases the sleeve coacts with the cushion cover to form a resilient finger gripping region that is deformable into a non-circular shape solely on finger pressure so that one can enhance the torque that can be comfortably applied to a twist-on wire connector. Since the deformable twist-on wire connectors return to the original shape when the finger pressure is released they occupy less space than similar connectors with permanently deformed shapes. FIGS. 23-25 show an example of another type of a shape deformable cushioned grip twist-on wire connector without a separate resilient inner sleeve.

Figure 12:
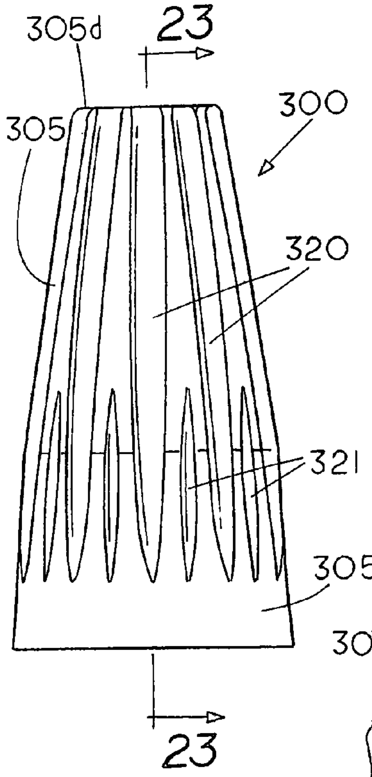
FIG. 12 shows a front view of a twist-on wire connector.

FIG. 12 shows a front view of an example of a shape deformable cushioned grip twist-on wire connector 300 having an open end. A cushion cover 305 comprising a layer of finger cushion material includes a first set of elongated ribs 320 circumferentially positioned and extending lengthwise from the base 305*c* of the twist-on wire connector cushion cover 305 to the apex 305*d* of the twist-on wire connector 300 to thereby cover the outer surface where grasping and rotating of the connector take place. While the connectors herein are shown with cushion material covering the entire outer surface the end surface of the cushion grip connector, which is perpendicular to the axis of rotation of the connector, may be left free of cushion material without departing from the spirit and scope of the invention. A feature of the ribs is that they form radial protrusions that enable a user to more readily grasp and rotate the twist-on wire connector 300 without the fingers slipping on the surface of the cushion cover 305. In addition to the first set of ribs 320 the twist-on wire connector includes a second set of shorter ribs 321 that are circumferentially spaced between the elongated ribs 320. A feature of the second set of ribs 321, which are spaced between the elongated ribs 320, is that they provide for a higher density of ribs or radial protrusions in a resilient finger gripping region where the greatest torque is usually applied to the twist-on wire connector 300. By providing a higher density of radial protrusions one minimizes the harshness on a user's finger when the twist-on wire connector is grasped in the finger grasping region proximate the open end of the wire connector since the force applied by the fingers is distributed over a wider area of the fingers by the multiple ribs. Although the example of FIG. 12 discloses ribs it should be understood that the same effect can be obtained through the use of sets of elongated grooves or reliefs in the outer cushion cover 305 of the twist-on wire connector 300.

Figure 13:
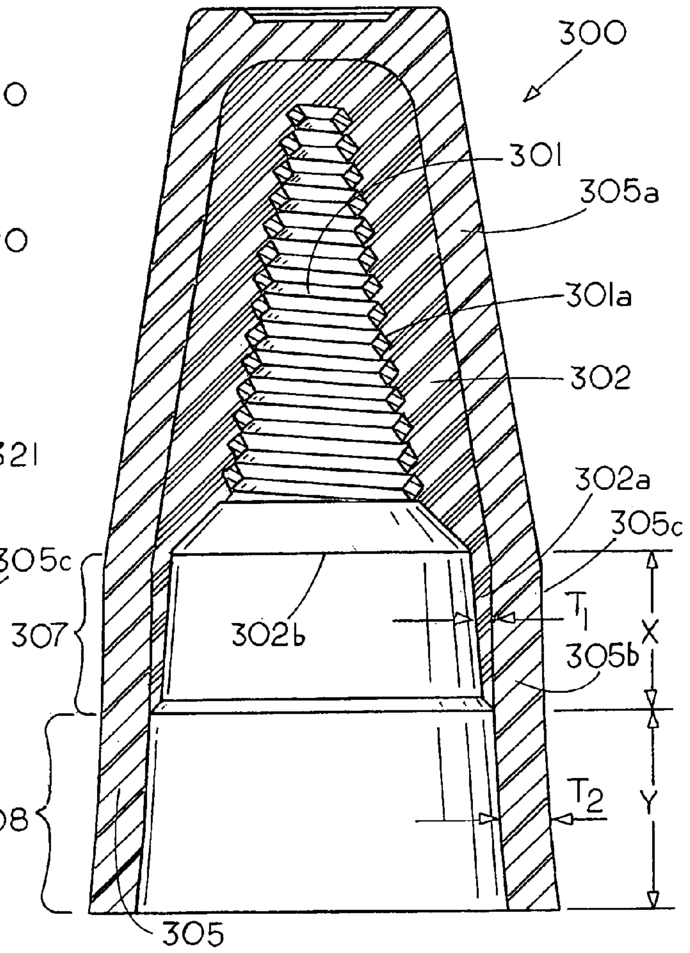
FIG. 13 is a cross sectional view of the twist-on wire connector of FIG. 12.

FIG. 13 shows a cross section view of cushioned grip twist-on wire connector 300 taken along lines 23-23 of FIG. 12 to reveal the interior and an internal resilient region 302*a* that can be finger deformed into a shape that enables enhancement of the torque applied to twist-on wire connector 300 without the aid of tools, wings or a permanently deformed twist-on wire connector.

FIG. 13 shows the shape deformable cushioned grip twist-on wire connector 300 with a truncated cone shaped finger cushion 305 comprising a one-piece layer of resilient material that deforms to the shape of a user's finger to reduce finger fatigue when applying the twist-on wire connector. In addition to the reduction of hand and finger fatigue, twist-on wire connector 300 permits a user to enhance the rotational torque that he or she applies to the deformable twist-on wire connector without the aid of tools through the use of a resilient finger grasping region 307.

Twist-on connector 300, which is shown in cross sectional view in FIG. 13, includes a conventional spiral coil 301 for twistingly securing electrical wires into electrical contact with each other. Secured to the outer surface 301*a* of spiral coil 301 is a truncated cone shaped sleeve 302 which is joined to a resilient annular base 302*a* at a circumferential junction 302*b*. The resilient annular base 302*a* cantilevers outward from junction 302*b* of the sleeve 302 with the length of the annular base 302*a* extending a distance denoted by x. In the example shown the sleeve 302 and the annular base 302*a* are molded in one-piece from the same material such as polypropylene, although other means and material for forming the sleeve 302 may be used. Although the base 302*a* and the sleeve 302 may be made from the same material the annular base 302*a* is characterized by being resilient as well as resistant to collapsing when subjected to a radial finger compression force in the circumferential region 307. The resilient finger gripping region, which may be used for application of enhanced finger torque, comprises a deformable circumferential region or band extending a distance X which is identified by reference numeral 307. That is, the application of a compressive finger pressure on the finger gripping region 307 deforms the annular base 302*a*. FIG. 13 shows that the annular base 302*a* is thinner than the thickness of the upper part of sleeve 302 which is thicker to provide a firm support for the spiral coil 301. With the annular base 302*a* having a thickness $T_1$ less than the thickness of the upper part of sleeve 302 the annular base 302*a* can be made from material such as polymer plastic so as to become deformable to an oval configuration in response to finger pressure exerted radially inward on the finger gripping region 307. The annular base 302*a*, while finger deformable to an oval or non-circular configuration, has sufficient crush resistance to finger pressure so as to maintain an oval shape that enables one to use the oval shape of the annular base 302*a* to generate leverage for rotating the twist-on wire connector about a set of electrical wires. When the twist-on wire connector 300 is released the deformed resilient annular base 302*a* returns to the original shape as shown in FIG. 13.

The truncated cone shaped finger cushion 305 comprises three regions, a first finger grasping region 305*a* which is supported by the truncated cone shaped sleeve 302*a* and spiral coil 301 and a second lengthwise extending resilient finger grasping region 307 as defined by the dimension X and a third non finger grasping region 308 forming a circumferential skirt 305*c*. Skirt 305*c* provides a protective cover over wires in the event that the wires engaged in the twist-on wire connector have been over stripped so that the uncovered portion of the electrical wire or wires extend beyond the annular base 302*a*. While skirts are known in the art in the embodiment shown in FIG. 13 the skirt and the cushion material are made from the same material to form a one-piece integral cushion cover 305. As the cushion cover is compressible to deform to the users fingers it follows that skirt 305*c* is also, however, skirt 305*c* lacks the support of a resilient sleeve to prevent it from collapsing in response to finger pressure. Consequently, in normal use little if any rotational torque is applied to the skirt 305*c*.

Figure 14:
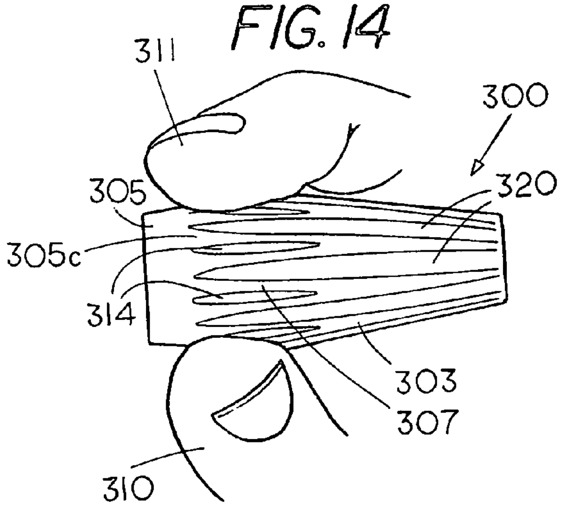
FIG. 14 shows a side view of the twist-on wire connector of FIG. 12 being grasped by a user

To illustrate the operation of the shape deformable cushioned grip twist-on wire connector 300 with a resilient finger gripping region 307 that allows one to comfortably enhance the torque applied to a twist on wire connector reference is made to FIG. 14 which shows a user grasping shape deformable cushioned grip twist-on wire connector 300 in the resilient finger grasping region 307 by grasping the connector 300 between the finger 311 and thumb 310 of a user. By grasping the twist-on wire connector 300 in the finger grasping region 307 proximate the open end or base of the twist-on wire connector 300 the finger 311 and the thumb 310 can be positioned to squeeze and deform annular base 302*a* through the layer of cushion material 303. As the user increases the radial pressure from finger 311 and thumb 310 the cushion cover 305 minimizes harshness to the users finger and thumb as resilient annular base 302*a* and the cushion cover 305 begin to deform shape deformable cushioned grip twist-on wire connector into an oval shape.

Figure 15:
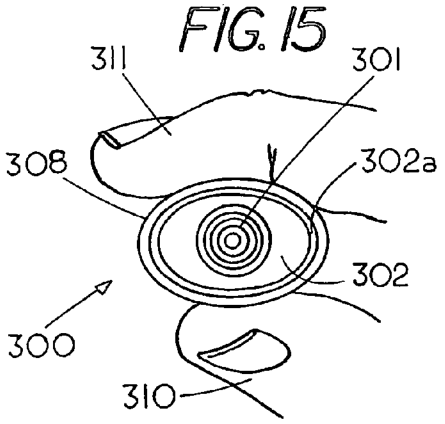
FIG. 15 shows an end view of the twist-on wire connector of FIG. 12 being grasped by a user

A reference to FIG. 15 shows that in response to finger and thumb pressure the normally circular shape of annular base 302*a* has been deformed into an oval shape. Although the annular base 302*a* deforms in response to finger pressure the annular base has sufficient stiffness to resist collapse due to finger compression forces. In contrast, the unsupported skirt 308 located proximate the end of the twist-on wire connector lacks the necessary stiffness and would collapse. Although a shape deformable cushioned grip twist-on wire connector 300 is shown with a skirt it is envisioned that the connector 300 may be made without a skirt.

Typically, with a round twist-on wire connector the rotational forces applied to the twist on connector are directed tangentially to the exterior surface of the twist-on wire connector. However, once the user has deformed the twist-on wire connector 300 into a non-circular shape the transmission of rotational forces is no longer limited to tangential forces on the finger gripping region 307. That is, the user is now able to enhance the finger torque applied to the twist-on wire connector 300 through forces normal to cushion cover 305. That is the oval shape of the twist-on wire connector 300 allows one to form a lever arm about a central axis of the twist-on wire connector 300 which allows one to enhance the rotational force to the twist-on wire connector as electrical wires are engaged with the spiral coil 301.

It should be noted that while radial extending wings have been used to enhance the rotational forces on twist on wire connectors the use of external projection of wings on twist-on wire connectors have the adverse effect of increasing the occupied space of the twist-on wire connector, which are normally placed in a junction box of limited size.

Figure 16:
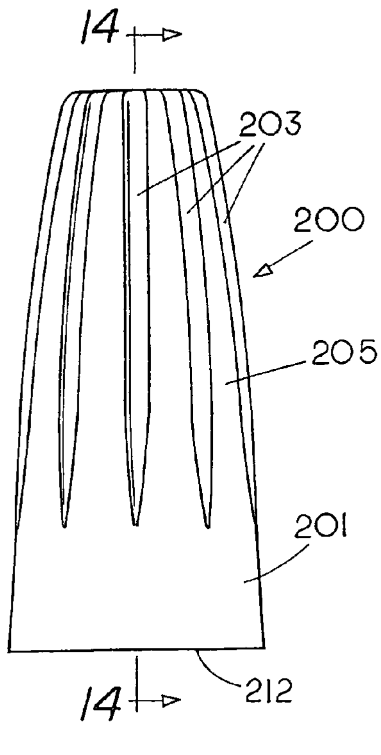
FIG. 16 shows a front view of another example of a cushioned grip twist-on wire connector.

FIG. 16 shows a front view of another example of a shape deformable cushioned grip twist-on wire connector 200 comprising a resilient cover 205 having a cylindrical base 201 with a circumferential edge 212, a set of longitudinally extending grooves 203 located in cover 205 to enhance gripping of the body of the twist-on wire connector. Although connector 200 shows a set of elongated longitudinal ribs, a combination of ribs and grooves may be used to provide enhanced gripping of the cover. While the grooves are shown on the top portion of connector 200 the grooves or ribs may be located on the base or bottom portion of connector 200 or on both the top and bottom portion of connector 200 in multiple sets of ribs or grooves that are interspersed with each other.

A feature of the twist-on wire connectors shown and described herein is that the resilient cover may be formed from material that lacks a colorant i.e. colorless and thus transparent. It has been found that the elimination of a colorant from the resilient cover produces a tackier feel and grip to the twist-on wire connector. In addition the use of a clear resilient cover allows one to observe the wire positioning in the twist-on wire connector as well as observe the positioning of the stripped wires in relation to the end of the twist-on wire connector. If a rigid shell is located in the twist-on wire connector the rigid shell may also be made from transparent material.

Figure 17:
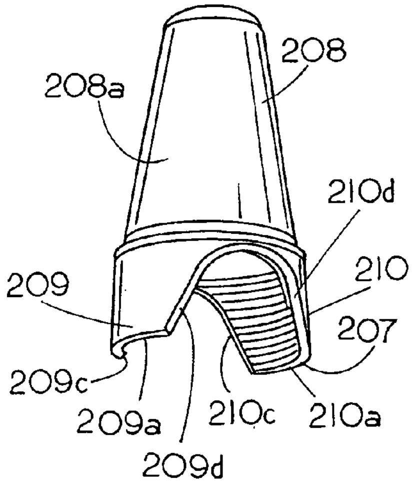
FIG. 17 is a perspective view of a hard shell with a pair of ears.

FIG. 17 shows a one-piece shell 208 for use in twist-on wire connector 200. Shell 208 is shown in perspective view in FIG. 17 to reveal an upper frusto conical shell or sleeve having an outer surface 208*a* extending from a closed end to an open end of the rigid with shell 208 having an undulating circumferential edge 207 located proximate the open end of the shell. Shell 208 includes a pair of resilient semi cylindrical ears 209 and 210 that extend in an axial or lengthwise direction from the open end of the shell 208. Ear 210 includes a generally length wise extending edge 210*c* on one side and a generally length wise extending edge 210*d* on the opposite side which is separated by an end edge 210*a*. Similarly, resilient ear 209 includes a generally lengthwise extending edge 209*c* on one side and a generally lengthwise extending edge 209*d* on the opposite side, which is separated by an end edge 209*a*.

Figure 18:
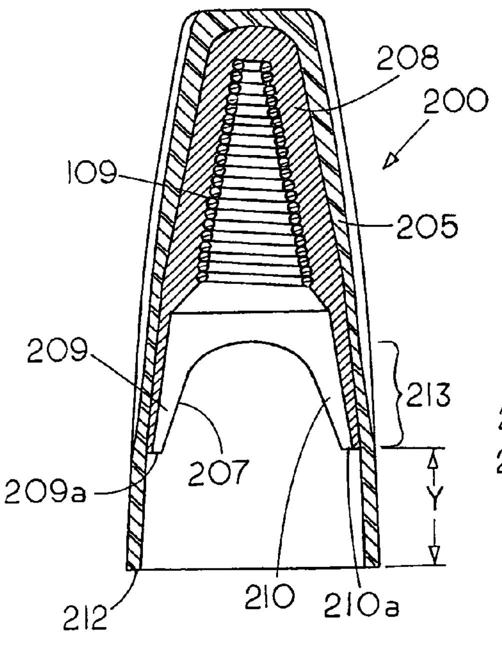
FIG. 18 is a section view taken along lines 14-14 of FIG. 16.

FIG. 18 shows a cross sectional view taken along lines 14-14 of FIG. 16 to reveal the one-piece resilient outer cover 205 completely encompassing all of the outer surface 208*a* of shell 208 except the undulating circumferential edge 207. As can be viewed in FIG. 18 wire access is available to the spiral coil 209 through the open end of the twist on wire connector 200. In the example shown, resilient cushion cover 205 comprises a one-piece layer of tensionally unbiased resilient material which is secured to shell 208 with the resilient cover 205 cantilevered over the undulating circumferential edge 207 of the shell 208. FIG. 18 shows a portion of the resilient cover 205 cantilevers over a circumferential edge 209*a* on an ear 209 and a further portion of resilient cover is cantilevered over circumferential edge 210*a* of ear 210 to form a skirt of length Y.

In the examples of FIG. 16-19, the twist-on wire connector 200 includes a frusto conical shell 205 of a finger cushion material for providing resilient finger support for reducing hand fatigue when applying a twist-on wire connector with a spiral coil 109 located in shell 205. Located in shell 205 is a sleeve 208 having ears 209 and 210 cantilevered outward from the spiral coil 109 and forming support for at least a portion of the shell 205 with the sleeve 208 having an undulating circumferential edge 207 to simultaneously provide for enhanced gripping and protection of a users finger as finger pressure is applied to the layer of finger cushion material 205 during rotational forming of an electrical connection in the spiral coil. The ears 209 and 210 of sleeve 208 may either be rigid or cantilever resiliently outward from spiral coil 109 to deform into an oval shape to thereby enhance rotational forces that can be applied to an electrical connection in the spiral coil.

Figure 19:
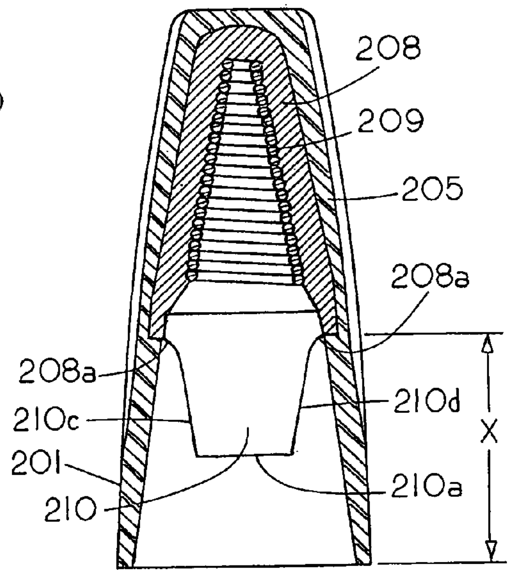
FIG. 19 is a section view taken along a plane located at 90 degrees to plane taken along lines 14-14 of FIG. 16

FIG. 18 and FIG. 19 show sectional views of connector 200 with FIG. 18 showing a view taken along lines 14-14 and FIG. 19 showing a sectional view taken at 90 degrees to the plane 14-14 of FIG. 16 to reveal the position of ears 209 and 210 on shell 208 with respect to cover 205. As can seen in FIG. 19 the base or band 201, which is the portion of resilient cover 205 that is not supported by a shell 208, cantilevers a distance x past the edge 208*a* of shell 208. FIG. 18 shows the base or band 201 cantilevers a distance y past the edge 209*a* of ear 209 of shell 208 and a distance y past the edge 210*a* of ear 210 of rigid shell 208 to provide a finger friendly, cushioned grip twist-on wire connector. The one-piece layer of tensionally unbiased resilient material 205 which is secured to the outer surface 208*a* completely covers the outer surface of the rigid shell to provide a finger cushion regardless of the finger orientation. A feature of the cantilevered base 201 is that portions of the base of resilient finger cushion material may be radially compressed into engagement with a portion or portions of the circumferential edge 207 in a finger gripping region 213 to thereby mechanically enhance the application of torque to the twist-on wire connector 200 without subjecting the user to harsh contact with the undulating circumferential edge 207. A feature of the sleeve or shell 208 is that the sleeve may be either rigid or resilient to enhance the user's ability to apply torque to the twist on wire connector.

Figure 20:
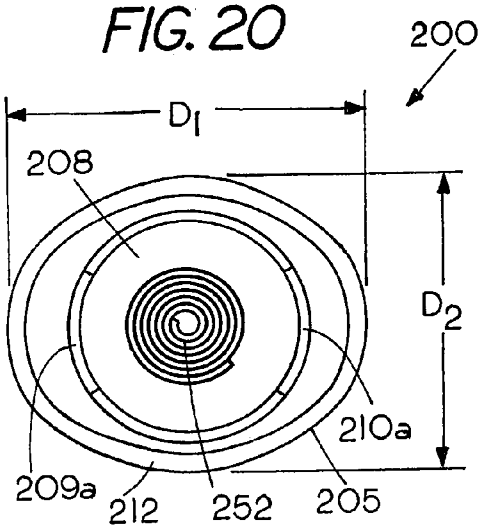
FIG. 20 is an end view of the connector of FIG. 16 in a deformed shape.

FIG. 20 shows an end view of shape deformable cushioned grip twist-on wire connector 200 revealing the deformed base having an oval shape with dimension $D_1$ larger than dimension $D_2$. Shell 208 with spiral coil 209 is centrally located and surrounded by circumferential edge 212 of resilient cover 205.

Figure 21:
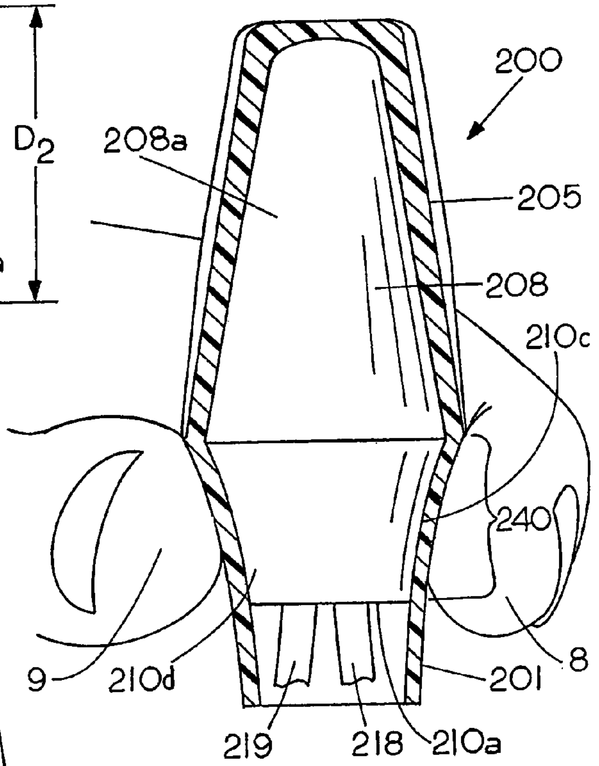
FIG. 21 is a partial cross sectional view of the connector of FIG. 16 being grasped in fingers of a user.

To illustrate the enhanced finger torque capability of shape deformable cushioned grip twist-on wire connector 200 reference should be made to FIG. 21 which shows fingers 8 and 9 grasping a resilient finger gripping region 240 of cantilevered cover 205. FIG. 21 shows the cantilevered finger gripping region 240 flexes radially inward to allow base 201 resilient cover 205 to mechanically engage the longitudinal extending edges 210*c* and 210*d* of ear 210 to thereby allow a user to enhance the torque to cover 205 and shell 208. That is, the base or lower band 201 of resilient cover 205 flexes inward and forms a pad or cushion between the internal edges 210*c* and 210*d* of ear 210 so that a greater rotational finger force can be applied against the internal edges 210*c* and 210*d* of ear 210 while inhibiting or preventing injure or fatigue to fingers 8 or 9. Similarly, ear 209 on the opposite side engages with cover 205 in an identical manner. Thus, the ears 209 and 210 of the shell 208 can be mechanically engaged with the finger gripping region 240 of the one-piece layer of tensionally unbiased material 205 by applying a finger compression force to the finger gripping region 240 of the tensional unbiased cushion material to thereby mechanically enhance the ability of a user to apply a rotational force to the shape deformable cushioned grip twist-on wire connector 200 while the resilient cover simultaneously functions to protect the fingers from injury or fatigue.

Figure 22:
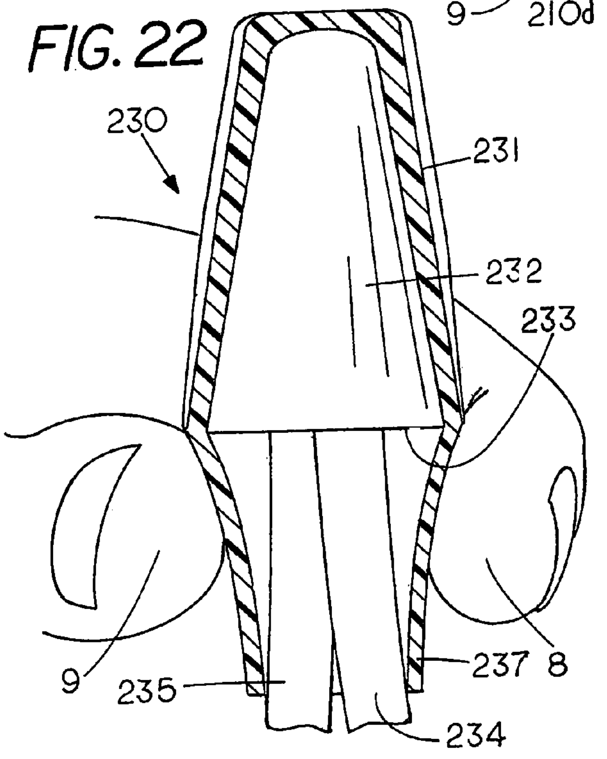
FIG. 22 is a partial cross sectional view of a connector of FIG. 16 without ears on the rigid shell being grasped in the fingers of a user.

FIG. 22 shows another example of a twist on wire connector with enhanced grip that cushions the grip for the user. Twist on wire connector 230 includes an outer resilient cover 231 which is tensionally unbiased and a rigid shell 232 that is similar to shell 208, however, shell 232 is devoid of ears and includes a rigid annular edge 233 that extends circumferentially around the open end of rigid shell 232 to form an internal gripping ridge. The lower band 237 of resilient cover 231, which is unsupported, cantilevers beyond the circumferential annular edge 233 of rigid shell 232. When pressure is applied by fingers 8 and 9 on the band 237 the band 237 flexes inward as illustrated in FIG. 22. Although the inward flexing of band 237 may cause the band 237 to incidentally contact wires 234 and 235 the bending of band 237 about edge 233 provides for enhanced finger grip since edge 233 can function as a support for the cover 231. Thus, the resilient cover 231 in engagement with the edge 233 enables one to provide enhanced finger pressure to bring the twist-on wire connector 230 into engagement with electrical wires 235 and 234 while at the same time resilient cover 237 cushions the grip for the user by placing a cushion on the internal gripping ridge 233 on the shell 232.

Thus, in the examples of FIG. 21 and FIG. 22 the cushion cover cantilevers over an internal rigid edge and coacts with an internal edge in the twist-on wire connector to form a cushioned gripping ridge which both protects the users fingers as well as enables the user to enhanced his or her grip of the twist-on wire connector.

In the examples of FIG. 22, the twist-on wire connector 230 includes a frusto conical shell 231 formed from a finger cushion material for providing resilient finger support for reducing hand fatigue when applying a twist-on wire connector with a spiral coil located in shell 231. Located in shell 231 is a support sleeve 232 having a circumferential edge 233 with the circumferential sleeve cover by the finger cushion material to simultaneously provide for enhanced gripping and protection of a users finger as finger pressure is applied to the layer of finger cushion material during rotational forming of an electrical connection in the spiral coil. In the example shown in FIG. 20 the sleeve is devoid of ears and the circumferential edge 233 forms a support for transmitting rotational forces to the twist-on wire connector. The support sleeve 232 may have either a round or an oval shape with the oval shape if one wants a twist-on wire connector where torque applied by finger pressure can be used enhance rotational forces to an electrical connection in the spiral coil.

FIG. 23 shows another example of a twist-on wire connector 250 that provides a cushion grip for the user. Twist-on wire connector 250 includes a resilient cover 251 and a set of grooves 250*a* located in on base 253 which forms a band proximate an open end of twist-on wire connector 250.

FIG. 24 shows a cross section view taken along lines 20-20 revealing the resilient cover 251 is secured directly to the spiral coil 252. That is in the twist-on wire connector 250 lacks an internal rigid shell between the spiral coil 252 and the resilient cover 251. The base 253 of resilient cover 251 is of sufficient thickness "t" so as to both compress and deform, yet provide sufficient resistance so as not to collapse as the twist-on wire connector 250 is rotated with respect to electrical wires in coil 252. The deforming of the resilient cover 251 providing for enhanced grip of the twist-on wire connector.

FIG. 25 shows an end view of shape deformable cushioned grip twist-on wire connector 205 in a deformed state revealing the spiral core 252 located within resilient cover. Resilient cover includes a base 253 with a circumferential edge 255. In the example shown in FIG. 25 the base 253 of the cover has dimension $D_1$ greater than $D_2$ to form an oval shape. In this example the base 253 is sufficiently resilient to form a finger gripping region that deforms but resists crushing.

To provide a resilient cover as shown and described herein one may typically select a cover a durometer of about 30 to 40 on the Shore A Scale.

Thus the invention may include a cushion cover that includes a layer of tensionally unbiased resilient material secured to and extending over the exterior surface of a twist-on wire connector to form a finger friendly cover with the layer of resilient material providing three axis deflection with sufficient compressibility so as to comfortably compress in response to radial finger pressure and to laterally deform in response to finger torque regardless of a finger grasping position on the cover with the layer of resilient material having sufficient shear resistance so as to resiliently yield without tearing when the finger torque is applied to the cover.

The invention also includes the method of applying a twist-on wire connector while inhibiting finger fatigue by compressing a cushion cover on a twist-on wire connector surface with the twist-on wire connector having a normal hand gripping region and a normal non hand gripping region.

The invention further includes shape deformable cushioned grip twist-on wire connector where finger compression on the resilient cushion cover enhance the torque to rotate the twist-on wire connector into electrical engagement.

The invention includes the method of making a twist-on wire connector that is finger friendly by forming a hard shell with an exterior surface consisting of normal hand gripping regions and normal non hand gripping regions and an interior wire engaging surface and securing a surface of a resilient non-heat shrinkable cover to the exterior surface of the hard shell without generating internal bias forces in the cover.

Thus, as described herein the cushion cover can be surface secured by chemical bonding or ionic bonding to the hard shell with or without the presence of an intermediate layer or can be surface secured by a mechanical interlock while still allowing the resilient material comprising the cushion cover to remain in a free-standing condition. In either case the intentional biasing of the cover on the hard shell is avoided.

A benefit of the wire connector with the cushion cover without rigid protruding parts is that it also provides impact resistance that can protect the wire connection in the wire connector and lessen the chances of an impact to the wire connector causing the wires therein to become loose. In addition it also lessens the chance of a wire becoming exposed due to an impact, which provides enhanced safety.

While the twist-on wire connector has been described in conjunction with conventional twist-on wire connectors the invention can also be used with sealant containing wire connectors.

We claim:

1. A finger friendly twist-on wire connector comprising:

a spiral coil having an outer surface;

a sleeve extending over the outer surface of the spiral coil, said sleeve having a resilient annular base deformable into an oval shape in response to finger pressure with the annular base having crush resistance to finger torque applied thereto; and a layer of finger cushion material located on an outer surface of the sleeve with the layer of finger cushion material conformable to a shape of the users finger as the annular base is deformed into the oval shape for forming an electrical connection therein.

2. A finger friendly twist-on wire connector comprising:

a spiral coil having an outer surface;

a sleeve extending over the outer surface of the spiral coil, said sleeve having a resilient annular base deformable into an oval shape in response to finger pressure with the annular base having crush resistance to finger torque applied thereto; and a layer of finger cushion material located on an outer surface of the sleeve with the layer of finger cushion material conformable to a shape of the users finger as the annular base is deformed into the oval shape for forming an electrical connection therein, said layer of finger cushion material extends over an entire outer surface of the twist-on wire connector and includes a first set of circumferentially spaced elongated ribs and a second set of shorter circumferentially spaced elongated ribs interspersed with said first set of elongated ribs.

3. The finger friendly twist-on wire connector of claim 1 wherein the layer of finger cushion material is transparent.

4. The finger friendly twist-on wire connector of claim 2 wherein the sleeve has a rigid section for supporting the spiral coil.

5. The finger friendly twist-on wire connector of claim 2 wherein the layer of finger cushion material is a one-piece layer of tensionally unbiased resilient material.

6. The finger friendly twist-on wire connector of claim 2 wherein the layer of finger cushion material is one piece.

7. The finger friendly twist-on wire connector of claim 2 wherein the layer of finger cushion material has a durometer of about 30 to 40 on the Shore A scale.

8. The finger friendly twist-on wire connector of claim 2 wherein the layer of finger cushion material includes an integral skirt.

9. The finger friendly twist-on wire connector of claim 2 wherein the layer of finger cushion material has a thickness in a range of 0.035 to 0.060 inches.

10. A finger friendly twist-on wire connector comprising:

a spiral coil having an outer surface;

a sleeve extending over the outer surface of the spiral coil, said sleeve having a resilient annular base deformable into an oval shape in response to finger pressure with the annular base having crush resistance to finger torque applied thereto, said annular base including a pair of resilient ears; and a layer of finger cushion material located on an outer surface of the sleeve with the layer of finger cushion material conformable to a shape of the users finger as the annular base is deformed into the oval shape for forming an electrical connection therein.

11. A finger friendly twist-on wire connector comprising:

a layer of finger cushion material forming a shell for reducing hand fatigue when applying a twist-on wire connector;

a spiral coil located in said shell; and a resilient sleeve cantilevered outward from said spiral coil and forming resilient but crushproof support for at least a portion of the shell, said resilient sleeve having a circumferential edge to simultaneously provide for enhanced gripping and protection of a users finger as finger pressure is applied to said layer of finger cushion material during rotational forming of an electrical connection in the spiral coil.

12. The finger friendly twist-on wire connector of claim 11 wherein the layer of finger cushion material includes a skirt integral with said layer of finger cushion material.

13. The finger friendly twist-on wire connector of claim 11 wherein the resilient sleeve comprises an annular band.

14. The finger friendly twist-on wire connector of claim 11 the resilient sleeve is round and is deformable into an oval shape in response to finger pressure to thereby enhance torque on an electrical connection therein.

15. The finger friendly twist-on wire connector of claim 11 wherein the layer of cushion material has an open end for insertion of an electrical wire therein.

16. A finger friendly twist-on wire connector comprising:

a layer of finger cushion material forming a shell for reducing hand fatigue when applying a twist-on wire connector;

a spiral coil located in said shell; and a resilient sleeve cantilevered outward from said spiral coil and forming resilient but crushproof support for at least a portion of the shell, said resilient sleeve having a circumferential edge to simultaneously provide for enhanced gripping and protection of a users finger as finger pressure is applied to said layer of finger cushion material during rotational forming of an electrical connection in the spiral coil, wherein said circumferential edge is an undulating circumferential edge.

17. A finger friendly twist-on wire connector comprising:

a layer of finger cushion material forming a shell for reducing hand fatigue when applying a twist-on wire connector;

a spiral coil located in said shell; and a resilient sleeve cantilevered outward from said spiral coil and forming resilient but crushproof support for at least a portion of the shell, said resilient sleeve having a circumferential edge to simultaneously provide for enhanced gripping and protection of a users finger as finger pressure is applied to said layer of finger cushion material during rotational forming of an electrical connection in the spiral coil, said resilient sleeve including a pair of ears.

18. A finger friendly twist-on wire connector comprising:

a layer of finger cushion material forming a frusto conical shaped shell for reducing hand fatigue when applying a twist-on wire connector;

a spiral coil located in said shell; and a sleeve having a circumferential edge covered by said layer of finger cushion material to simultaneously provide for enhanced gripping and protection of a users finger as finger pressure is applied to said layer of cushion material during rotational forming of an electrical connection in the spiral coil.

19. The finger friendly twist-on wire connector of claim 18 wherein the sleeve is resilient and the layer of finger cushion material is transparent and includes an integral skirt.

20. A finger friendly twist-on wire connector comprising:

a layer of finger cushion material forming a frusto conical shaped shell for reducing hand fatigue when applying a twist-on wire connector;

a spiral coil located in said shell; and a sleeve having a circumferential edge covered by said layer of finger cushion material to simultaneously provide for enhanced gripping and protection of a users finger as finger pressure is applied to said layer of cushion material during rotational forming of an electrical connection in the spiral coil; and at least two sets of elongated ribs with the sets of elongated ribs circumferentially interspersed with each other.

* * * * *

UNITED STATES PATENT AND TRADEMARK OFFICE

CERTIFICATE OF CORRECTION

PATENT NO. : 8,067,692 B2
APPLICATION NO. : 12/455865
DATED : November 29, 2011
INVENTOR(S) : Hiner et al.

It is certified that error appears in the above-identified patent and that said Letters Patent is hereby corrected as shown below:

Title page should read:

Item [54] Title: "Cusion Grip Twist-On Wire Connector" should read --Cushion Grip Twist-On Wire Connector--

Item [75] Inventors: "James Keevan" should read --James Keeven--

Claims:

Claim 1, col. 19, line 6 "users fingers" should read --user's fingers--

Claim 2, col. 19, line 18 "users fingers" should read --user's fingers--

Claim 10, col. 19, line 55 "users fingers" should read --user's fingers--

Claim 11, col. 19, line 67 "users fingers" should read --user's fingers--

Claim 16, col. 20, line 28 "users fingers" should read --user's fingers--

Claim 17, col. 20, line 43 "users fingers" should read --user's fingers--

Claim 18, col. 20, line 56 "users fingers" should read --user's fingers--

Claim 20, col. 21, line 4 "users" should read --user's--

Signed and Sealed this
Thirty-first Day of January, 2012

David J. Kappos

David J. Kappos
*Director of the United States Patent and Trademark Office*

UNITED STATES PATENT AND TRADEMARK OFFICE

CERTIFICATE OF CORRECTION

PATENT NO. : 8,067,692 B2
APPLICATION NO. : 12/455865
DATED : November 29, 2011
INVENTOR(S) : Hiner et al.

It is certified that error appears in the above-identified patent and that said Letters Patent is hereby corrected as shown below:

Title Page, Item [54] and at Column 1, lines 1 and 2,
Title: “Cusion Grip Twist-On Wire Connector” should read --Cushion Grip Twist-On Wire Connector--

Title Page, Item [75] Inventors: “James Keevan” should read --James Keeven--

Claims:

Claim 1, col. 19, line 6 “users fingers” should read --user’s fingers--

Claim 2, col. 19, line 18 “users fingers” should read --user’s fingers--

Claim 10, col. 19, line 55 “users fingers” should read --user’s fingers--

Claim 11, col. 19, line 67 “users fingers” should read --user’s fingers--

Claim 16, col. 20, line 28 “users fingers” should read --user’s fingers--

Claim 17, col. 20, line 43 “users fingers” should read --user’s fingers--

Claim 18, col. 20, line 56 “users fingers” should read --user’s fingers--

Claim 20, col. 21, line 4 “users” should read --user’s--

This certificate supersedes the Certificate of Correction issued January 31, 2012.

Signed and Sealed this
Twenty-first Day of February, 2012

David J. Kappos
*Director of the United States Patent and Trademark Office*